United States Patent
Krasnoiarov et al.

(10) Patent No.: US 7,861,174 B2
(45) Date of Patent: Dec. 28, 2010

(54) METHOD AND SYSTEM FOR ASSEMBLING CONCURRENTLY-GENERATED CONTENT

(75) Inventors: Boris Andreyevich Krasnoiarov, El Cerrito, CA (US); Michael Wei-Chin Young, Oakland, CA (US)

(73) Assignee: Oracle International Corporation, Redwood Shores, CA (US)

(*) Notice: Subject to any disclaimer, the term of this patent is extended or adjusted under 35 U.S.C. 154(b) by 1445 days.

(21) Appl. No.: 10/077,423

(22) Filed: Feb. 15, 2002

(65) Prior Publication Data
US 2002/0156812 A1 Oct. 24, 2002

Related U.S. Application Data

(63) Continuation-in-part of application No. 09/949,532, filed on Sep. 7, 2001.

(60) Provisional application No. 60/231,433, filed on Sep. 8, 2000, provisional application No. 60/269,641, filed on Feb. 16, 2001.

(51) Int. Cl.
*G06F 17/00* (2006.01)
(52) U.S. Cl. .................. 715/736; 715/234; 715/277; 715/744; 709/217; 709/245
(58) Field of Classification Search ............. 709/311, 709/203, 217; 395/200.33; 715/513; 707/2, 707/10
See application file for complete search history.

(56) References Cited

U.S. PATENT DOCUMENTS

| | | | |
|---|---|---|---|
| 5,754,755 A | 5/1998 | Smith, Jr. | |
| 5,819,271 A | 10/1998 | Mahoney et al. | |
| 5,894,554 A * | 4/1999 | Lowery et al. | 709/203 |
| 5,907,837 A | 5/1999 | Ferrel et al. | |
| 5,974,445 A | 10/1999 | Pivnichny et al. | |
| 5,983,227 A * | 11/1999 | Nazem et al. | 707/10 |
| 6,014,137 A | 1/2000 | Burns | |
| 6,014,638 A | 1/2000 | Burge et al. | |
| 6,026,433 A | 2/2000 | D'Arlach et al. | |
| 6,065,120 A | 5/2000 | Laursen et al. | |
| 6,112,192 A | 8/2000 | Capek et al. | |
| 6,128,663 A | 10/2000 | Thomas | |
| 6,134,548 A | 10/2000 | Gottsman et al. | |
| 6,161,126 A | 12/2000 | Wies et al. | |
| 6,185,614 B1 | 2/2001 | Cuomo et al. | |

(Continued)

OTHER PUBLICATIONS

Method for Providing Personalized Information on the Web, IBM TDB, Oct. 1997, vol. 40, No. 10, pp. 3-6.

(Continued)

*Primary Examiner*—Doug Hutton
*Assistant Examiner*—Quoc A Tran
(74) *Attorney, Agent, or Firm*—Townsend and Townsend and Crew LLP

(57) ABSTRACT

A method, apparatus, and computer-readable media for satisfying a single request from a client for a plurality of content components derived from content hosted by a plurality of distinct, separately accessible component servers comprises receiving a single request specifying the content components; after receiving the single request, generating a plurality of information requests for the content; sending each information request to the component server hosting the content corresponding to the information request before receiving a response to any of the information requests; forming the content components from the responses to the information requests; and transmitting the content components to the client.

80 Claims, 14 Drawing Sheets

U.S. PATENT DOCUMENTS

| | | | |
|---|---|---|---|
| 6,327,628 B1 * | 12/2001 | Anuff et al. | 719/311 |
| 6,675,212 B1 * | 1/2004 | Greenwood | 709/224 |
| 6,941,339 B1 * | 9/2005 | McMichael | 709/203 |
| 2002/0178232 A1 * | 11/2002 | Ferguson | 709/217 |

OTHER PUBLICATIONS

Supplemental European Search Report, for EP 02709545, dated Sep. 25, 2008, 5 pages.

* cited by examiner

METHOD AND SYSTEM FOR ASSEMBLING CONCURRENTLY-GENERATED CONTENT

CROSS-REFERENCE TO RELATED APPLICATIONS

This application is a Continuation-in-Part of U.S. Nonprovisional Application Ser. No. 09/949,532 filed Sep. 7, 2001, which is incorporated by reference herein. This application claims the benefit of U.S. Provisional Application No. 60/231,433 filed Sep. 8, 2000, which is incorporated by reference herein. This application also claims the benefit of United States Provisional Application No. 60/269,641 filed Feb. 16, 2001, which is incorporated by reference herein.

BACKGROUND

This patent specification relates generally to information retrieval and distribution systems. More specifically, it relates to a method and system for assembling and distributing content components generated in parallel by multiple component servers.

It is common for today's enterprise networks to comprise scattered arrangements of different hardware and software systems. This is due to the ever-changing data management needs of corporate enterprises, and to continuing advances in the computing hardware and software available to meet those needs. Commonly, different entities within an enterprise (for example, different departments or work sites) have disparate software applications, groupware systems, or data maintenance architectures/procedures, such that information created or maintained by one entity is not usable by another entity.

Corporate portals, also referred to as intranet portals, have been introduced to increase the accessibility and usability of information stored across the heterogeneous systems of an enterprise network. A corporate portal, which is usually overlaid onto an existing enterprise network, is designed to extract content from disparate systems on the enterprise network and to allow easier, personalized access to that content by end users. It is to be appreciated that while the features and advantages of the implementations described infra are particularly advantageous for corporate portal environments, enhancing their speed, openness, scalability, and stability, the features and advantages of the implementations are also applicable in other environments, such as with personalized "Web portals" that serve broad user bases. By way of example and not by way of limitation, one example of a corporate portal is the Plumtree Corporate Portal available from Plumtree Software, Inc. of San Francisco, Calif., while examples of personalized Web portals are typified by the MyYahoo! service from Yahoo, Inc. of Sunnyvale, Calif. and MyExcite from At Home Corp. of Redwood City, Calif. Corporate portals are also described in commonly assigned U.S. Ser. No. 09/896,039, filed Jun. 29, 2001, which is incorporated by reference herein.

FIG. 1 shows a simplified view of an exemplary user screen 102 associated with a corporate portal system, comprising a plurality of content components 104-110. A content component refers to any content that is assembled, along with other content components, into a unified body of content. In the example of FIG. 1, a company news content component 104 includes an HTML display of news that is extracted, for example, from one or more company news servers, and arranged for display to the end user. A company stock quote content component 106 comprises an HTML display of a stock quote for the company and its competition that is extracted, for example, from a stock quote server. Also shown in FIG. 1 is an email content component 108 and a customer relationship management (CRM) content component 110. According to the end user's ID 112, the corporate portal displays the content components 104-110 in a personalized arrangement (for example, news at the upper left, company stock quote in the upper right, and so on) and also selects the information within each content component based on the user's ID (for example, showing the user's personal email account only, showing sports news on top of world news, showing only the user's personal CRM information, and so on). The user screen 102 of FIG. 1 would typically appear after the user (Jane Smith) has logged into the corporate portal system by supplying a user name and password.

More generally, the content components themselves can be any information communicable via any standard network protocol such as Hypertext Transfer Protocol (HTTP), Secure Hypertext Transfer Protocol (HTTPS), File Transfer Protocol (FTP), Wireless Application Protocol (WAP), and the like. Information communicable via a network includes text information, image information, Extensible Markup Language (XML), Hypertext Markup Language (HTML), or any other type of information that can be stored in a computer file, including images, sounds, and video. Throughout this specification we refer to any information sent over a network as content. We use the term content component to refer to any content that is assembled, along with other content components, into a unified body of content.

An exemplary content component is the HTML output generated by a script that communicates with an email client application. An email client application sends and receives email. Such applications usually let users compose email, and store email addresses in an address book. This script provides an HTML interface to the email client application. This script is hosted by the computer hosting the email application. This script generates HTML displaying the user's email messages, along with HTML allowing the user to compose and send email messages. This script can communicate with the email application through the application's programming interface. In this example, the HTML generated by the script is the content component (see, for example, FIG. 1, content component 108).

Other exemplary content components are two types of HTML generated by a program that communicates with a database application. This program can be hosted by the same computer hosting the database application. The database application stores and maintains a database of information organized into records. This program can communicate with the database application via the application's interface. This program generates HTML that allows the user to search for database records. For this case, the content component is a query box. This program also generates HTML that displays database records to the user. For this case, the content component is a view of the database records (see, for example, FIG. 1, content component 110). Further examples of content components include, but are not limited to, resources generated by a calendar application, a workflow application, a database storing proprietary personal information, a database storing proprietary business information, a database storing secure personal information, a database storing secure business information, an e-business application, and the like.

FIG. 2 shows a system 200 for delivering personalized content according to a conventional method often referred to as server-side caching. A plurality of component servers 202-206 provide content components to a Web server 208. Web server 208 receives the content components in a plurality of caches 210-214. Referring to FIG. 2, weather server 202 provides content components such as weather maps and forecasts into cache 210. Stock quotes server 204 provides content components such as stock quotes and charts into cache 212. News server 206 provides content components such as headlines and news features into cache 214.

Users employ user terminals 218A and 218B through 218N to access Web server 208 over a network 220 such as the Internet. A user establishes personalized settings in part by selecting certain of the types of content components that are routinely provided to caches 210-214. Subsequent to this personalization step, the user sends a request for personalized content to main server 208. In response, a main process 216 within Web server 208 populates a Web page with the latest cached content components according to the personalized settings for the user, and sends the personalized Web page to a user terminal 218 for display to the user.

FIG. 3 shows a system 300 for delivering personalized content according to a conventional method often referred to as client-side retrieval. A plurality of component servers 302-306 host various types of content components. Referring to FIG. 3, an email server 302 hosts content components such as email messages for a group of users. A stock quotes server 304 hosts content components such as stock quotes and charts. A news server 306 hosts content components such as headlines and news features. A main process 316 within Web server 308 maintains a list of the types of content components available from component servers 302-306, and advertises these types of content components to users.

Users employ user terminals 318A and 318B through 318N to access Web server 308 over a network 320 such as the Internet. A user establishes personalized settings by selecting certain of the types of content components that are advertised by Web server 308. Subsequent to this personalization step, the user sends a request for personalized content to Web server 308. In response, main process 316 populates a Web page with links, scripts, applets, or the like, that, when executed by a browser, cause the browser to retrieve the latest content components according to the personalized settings for the user. Main process 316 sends the Web page having those links, scripts, applets, etc. to the user terminal 318, which executes the links, scripts, applets, etc. to retrieve the personalized content components from component servers 302-306 for display to the user.

FIG. 4 shows a system 400 for delivering personalized content according to a prior art method. A plurality of content servers 402-408 host various types of content. Referring to FIG. 4, a CRM server 402 hosts content such as customer lists and customer contact information. An email server 404 hosts content such as email messages for a group of users.

A stock quotes server 406 hosts content such as stock quotes and charts. A news server 408 hosts content such as headlines and news features. A main process 416 within a Web server 410 maintains a list of the types of content available from content servers 402-408, and advertises these types of content to users.

Users employ user terminals 418A and 418B through 418N to access Web server 410 over a network 420 such as the Internet. A user establishes personalized settings in part by selecting certain of the types of content that are advertised by Web server 410. Subsequent to this personalization step, the user sends a request for personalized content to Web server 410. In response, main process 416 invokes a series of processes that execute sequentially to retrieve the latest content for the content types specified by the user's personalized settings from content servers 402-408. For example, referring to FIG. 4, main process 416 invokes processes 422-428.

Process 422 executes first. Process 422 employs a remote procedure call (RPC) RPC1 and a script SCRIPT1 to retrieve the CRM content specified by the user's personalized settings from CRM server 402. After the CRM content is retrieved, process 424 executes.

Process 424 employs a remote procedure call RPC2 and a script SCRIPT2 to retrieve the email content specified by the user's personalized settings from email server 404. After the email content is retrieved, process 426 executes. Process 426 employs a remote procedure call RPC3 and a script SCRIPT3 to retrieve the stock quotes content specified by the user's personalized settings from stock quotes server 406. After the stock quotes content is retrieved, process 428 executes. Process 428 employs a remote procedure call RPC4 and a script SCRIPT4 to retrieve the news content specified by the user's personalized settings from news server 408. Main process 416 assembles the retrieved content components to form a personalized Web page, and sends the personalized Web page to the user terminal for display to the user.

One disadvantage of the approach of FIG. 4 results from the sequential execution of the retrieval processes. The overall time for processing the user's request includes the sum of the response times of the individual requests sent to the content servers 402-408. If one the retrieval processes takes an unusually long time to complete or exceeds a timeout period, the overall retrieval process is delayed by that time period. Moreover, if one of the retrieval processes hangs for some reason, no content is delivered to the user at all.

SUMMARY

In general, in one aspect, the invention features a method, apparatus, and computer-readable media for satisfying a single request from a client for a plurality of content components derived from content hosted by a plurality of distinct, separately accessible component servers. It comprises receiving a single request specifying the content components; after receiving the single request, generating a plurality of information requests for the content; sending each information request to the component server hosting the content corresponding to the information request before receiving a response to any of the information requests; forming the content components from the responses to the information requests; and transmitting the content components to the client.

Particular implementations can include one or more of the following features. The single request is a request for a personalized Web page; the forming step comprises assembling the personalized Web page from the content components; and the transmitting step comprises sending the personalized Web page to the client. Implementations can comprise instantiating a timer after the step of sending each information request and before the step of forming the personalized web page; and if no response is received from one of the component servers prior to a timeout period of the timer, performing the steps of immediately establishing the response from that component server as a null value, and carrying out the steps of forming the personalized Web page and transmitting the personalized Web page to the client without waiting for that response. The component servers generate the responses in different data formats, and implementations can comprise converting the responses to a common data format. The common data format is based on a markup language. The converting step is performed at the respective component servers. The converting step is performed at a main server, the main server also receiving the single request from the user and transmitting the personalized Web page to the client. The main server is a corporate portal server. The main server is an Internet portal server. Each of the main server and the component servers are physically separate, and the information requests and responses are transmitted according to a standard network protocol. The standard network protocol is selected from the group consisting of HTTP, HTTPS, WAP, and FTP. The component servers are each selected from the group consisting of email servers, enterprise resource planning servers, and customer relationship management servers. The information requests are transmitted according to a standard network protocol. The standard network protocol is selected from the group consisting of HTTP, HTTPS, WAP, and FTP. Implementations can comprise generating a state machine to represent the progress of each information request; and recursively processing the state machines to advance the progress of each information request.

Advantages that can be seen in particular implementations include one or more of the following. Implementations issue requests for component content in parallel. This feature provides faster execution than conventional systems that issue requests sequentially. Further, if any request is unsuccessful, the content components received by the successful requests are sent to the user. In conventional systems, the failure to receive any content component could result in the delivery to the user of no content at all. Implementations incorporate a timeout feature that limits the maximum time a user must wait for a content request to be fulfilled. If any content component has not been received by the end of the timeout period, the content components gathered up to that point are sent to the user without further delay.

Implementations feature interfaces with component servers that provide cross-platform integration even when content resides on disparate, incompatible systems (for example, CORBA, Java, Microsoft, mainframes) and standardized access to data, for example, using HTTP protocol and XML content. Implementations also provide isolation of unstable content sources and access code, and increase scalability by easily distributing processing.

A description of one or more implementations are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
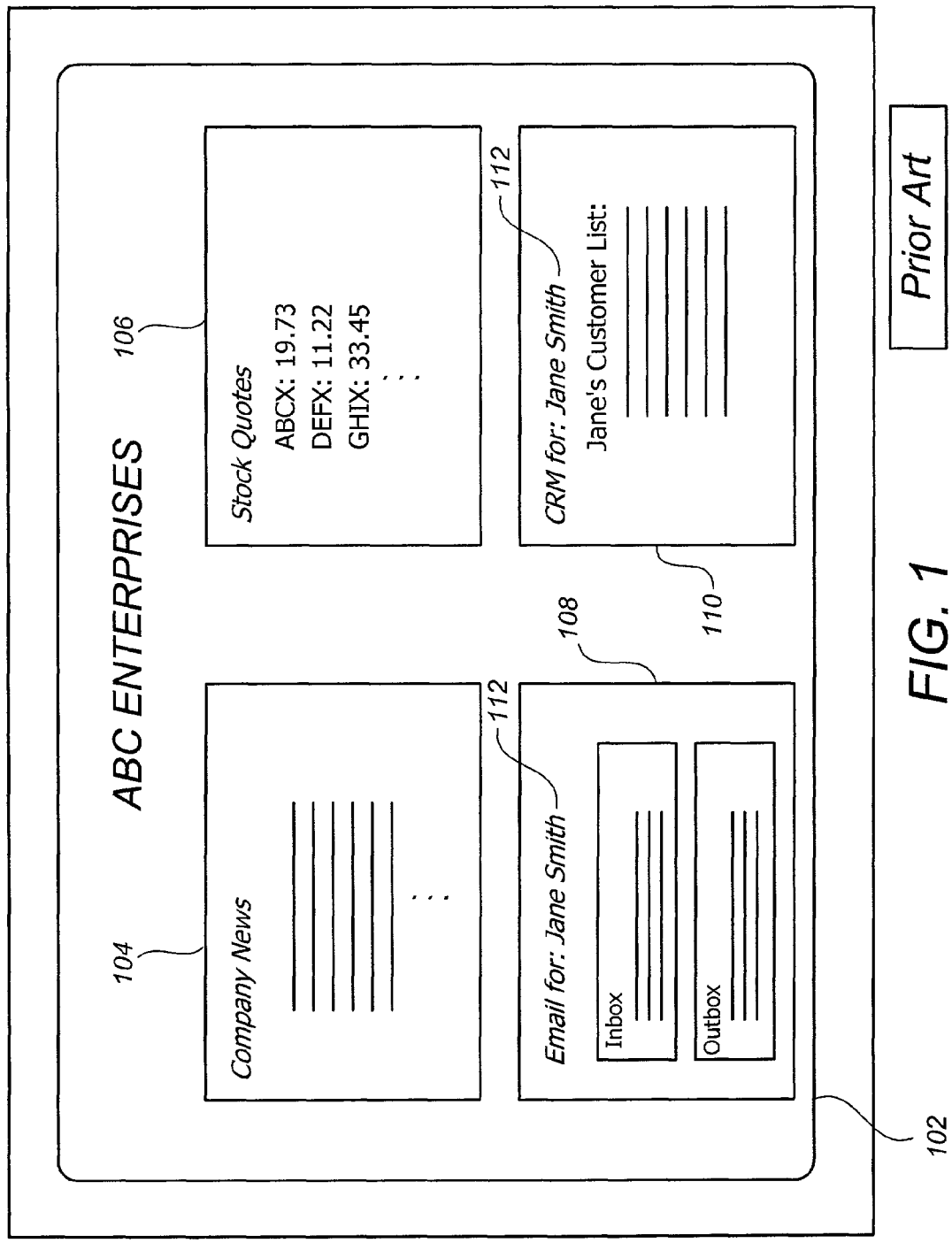
FIG. 1 shows a simplified view of an exemplary user screen associated with a corporate portal system, comprising a plurality of content components.
Figure 2:
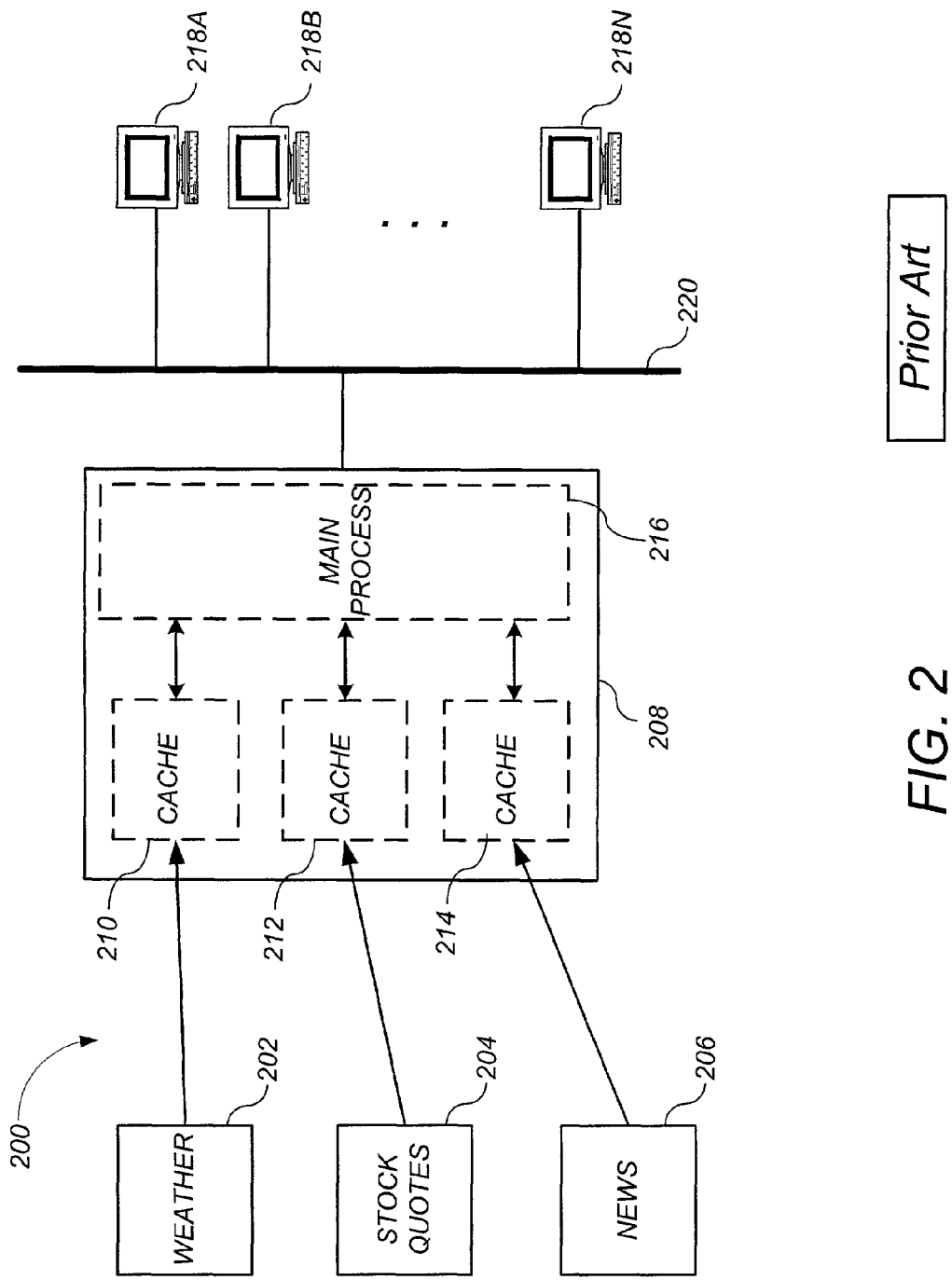
FIG. 2 shows a system for delivering personalized content according to a prior art method.
Figure 3:
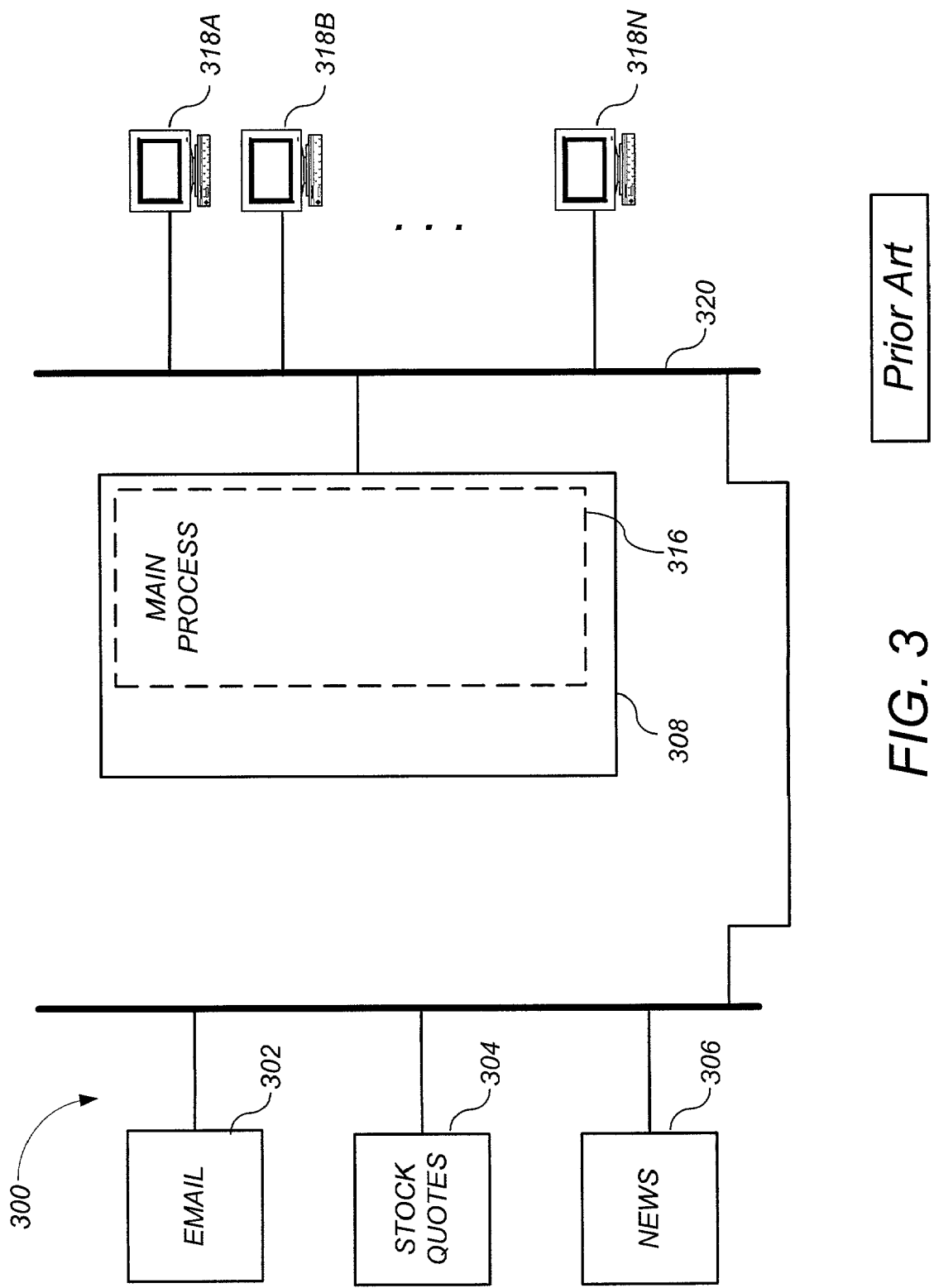
FIG. 3 shows a system for delivering personalized content according to a prior art method.
Figure 4:
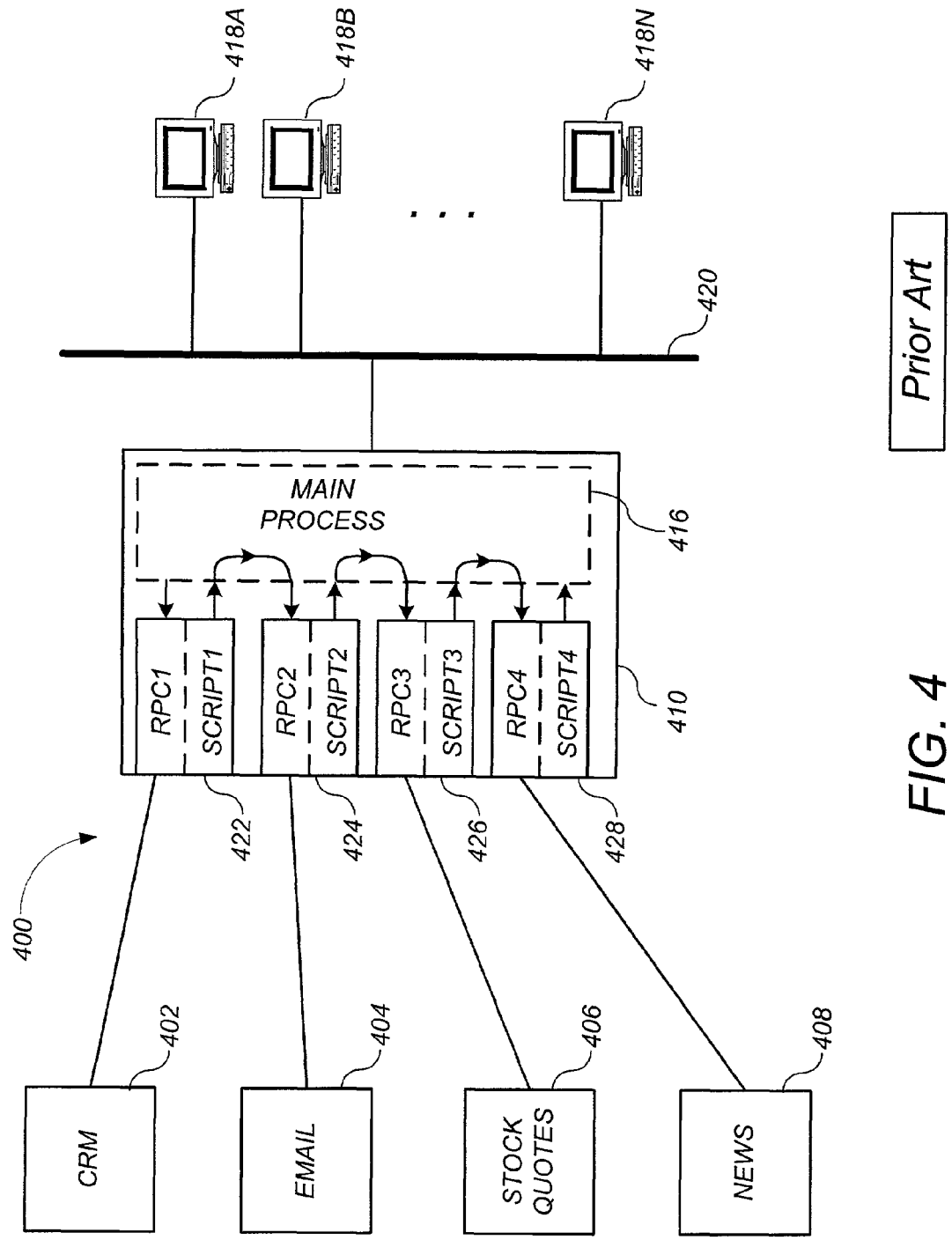
FIG. 4 shows a system for delivering personalized content according to a prior art method
Figure 5:
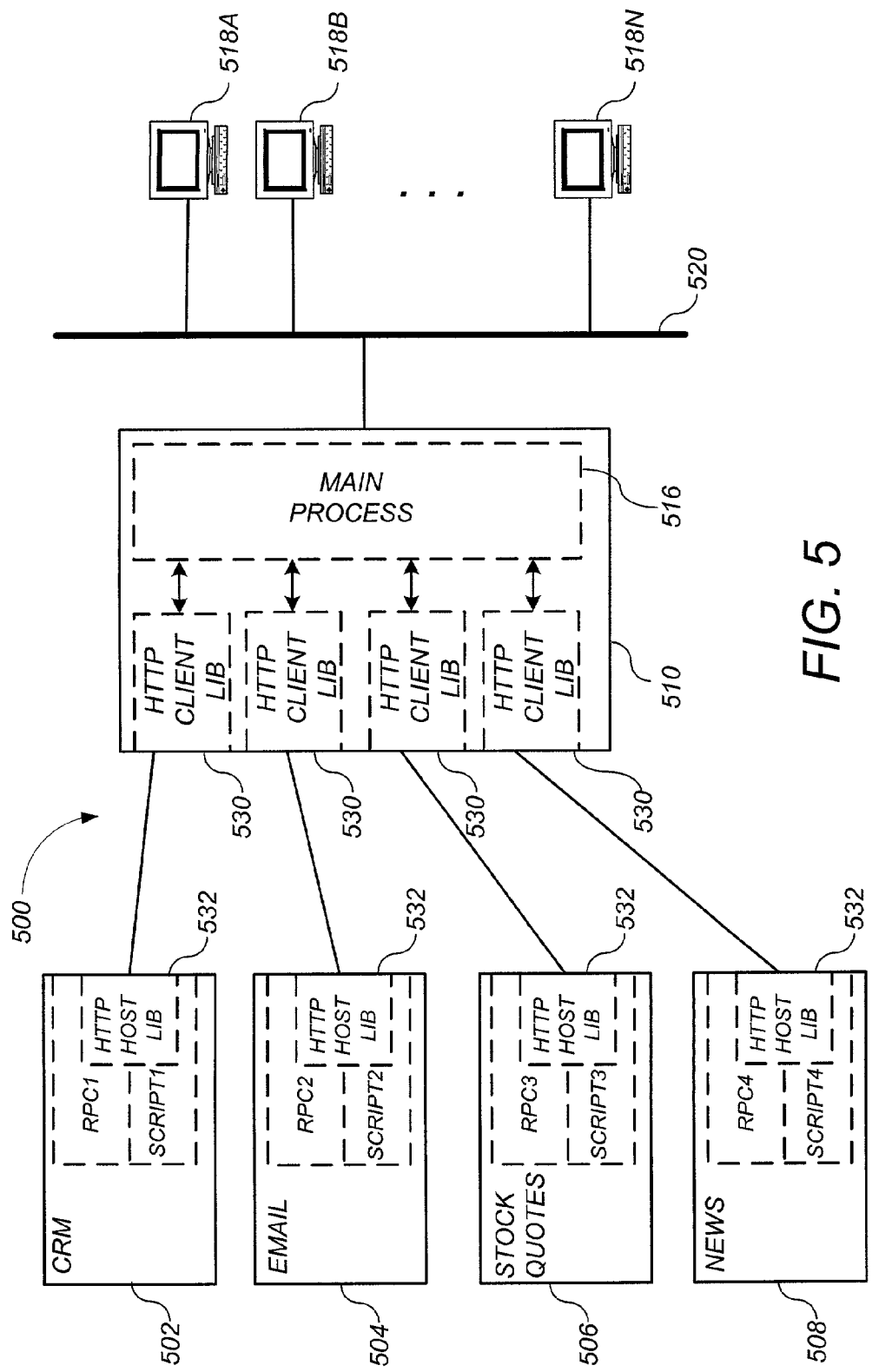
FIG. 5 shows a system for delivering personalized content according to one implementation.

FIG. 5 shows a system 500 according to one implementation. A plurality of component servers 502-508 host different types of content components. Referring to FIG. 5, a CRM server 502 hosts content such as customer lists and customer contact information. An email server 504 hosts content such as email messages for a group of users. A stock quotes server 506 hosts content such as stock quotes and charts. A news server 508 hosts content such as headlines and news features. A main process 516 within a main server 510 maintains a list of the types of content available from content servers 502-508, and advertises these types of content to users. Of course, other types of content, such as enterprise resource planning content, can be made available to users.

Users employ user terminals 518A and 518B through 518N to access main server 510 over a network 520 such as the Internet. As used herein, "user terminal" refers to any device that a user could employ to access the main server including a computer running a Web browser, a personal digital assistant, a cellular phone, and the like.

Main server 510 communicates with each component server 502-508 using a standard protocol such as HTTP. In one implementation, main server 510 uses the same protocol for all of the component servers. Any needed protocol translations are performed at the component server. Referring to FIG. 5, main server 510 includes one or more HTTP client libraries 530. Each component server 502-508 contains includes an HTTP host library 532. Together libraries 530 and 532 facilitate communication between the main and component servers.

Each component server may operate under a different protocol. For this reason, each component server includes a remote procedure call (RPC) and a script. The RPC and script collect the requested content components and perform any necessary protocol and data format translations. CRM component server 502 employs a remote procedure call RPC1 and a script SCRIPT1 to retrieve CRM content. Email server 504 employs a remote procedure call RPC2 and a script SCRIPT2 to retrieve email content. Stock quotes server 506 employs a remote procedure call RPC3 and a script SCRIPT3 to retrieve stock quotes content. News server 508 employs a remote procedure call RPC4 and a script SCRIPT4 to retrieve news content. Main process 516 assembles the retrieved content components to form a personalized Web page, and sends the personalized Web page to the user.

Figure 6:
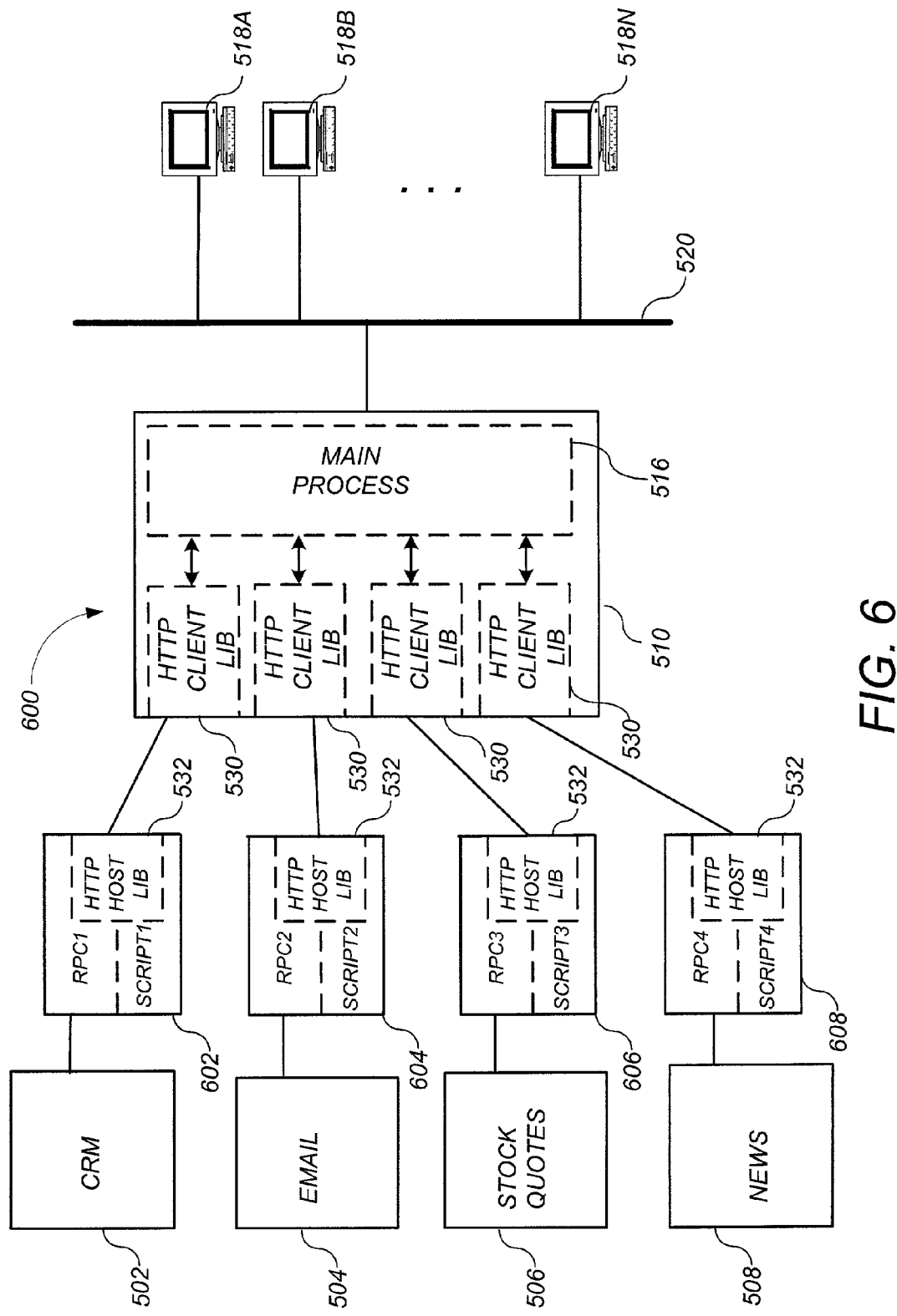
FIG. 6 shows a system for delivering personalized content according to one implementation.

FIG. 6 shows a system 600 according to an implementation featuring separate intermediate servers. According to this implementation, an intermediate server is provided for each component server. Each intermediate server includes a HTTP host library 532, a remote procedure call (RPC) and a script that function as described above. Referring to FIG. 6, an intermediate server 602 employs a remote procedure call RPC1 and a script SCRIPT1 to retrieve CRM content from CRM server 502. An intermediate server 604 employs a remote procedure call RPC2 and a script SCRIPT2 to retrieve email content from email server 504. An intermediate server 606 employs a remote procedure call RPC3 and a script SCRIPT3 to retrieve stock quotes content from stock quotes server 506. An intermediate server 604 employs a remote procedure call RPC4 and a script SCRIPT4 to retrieve news from news server 508. Main process 516 assembles the retrieved content to form a personalized Web page, and sends the personalized Web page to the user.

Figure 7:
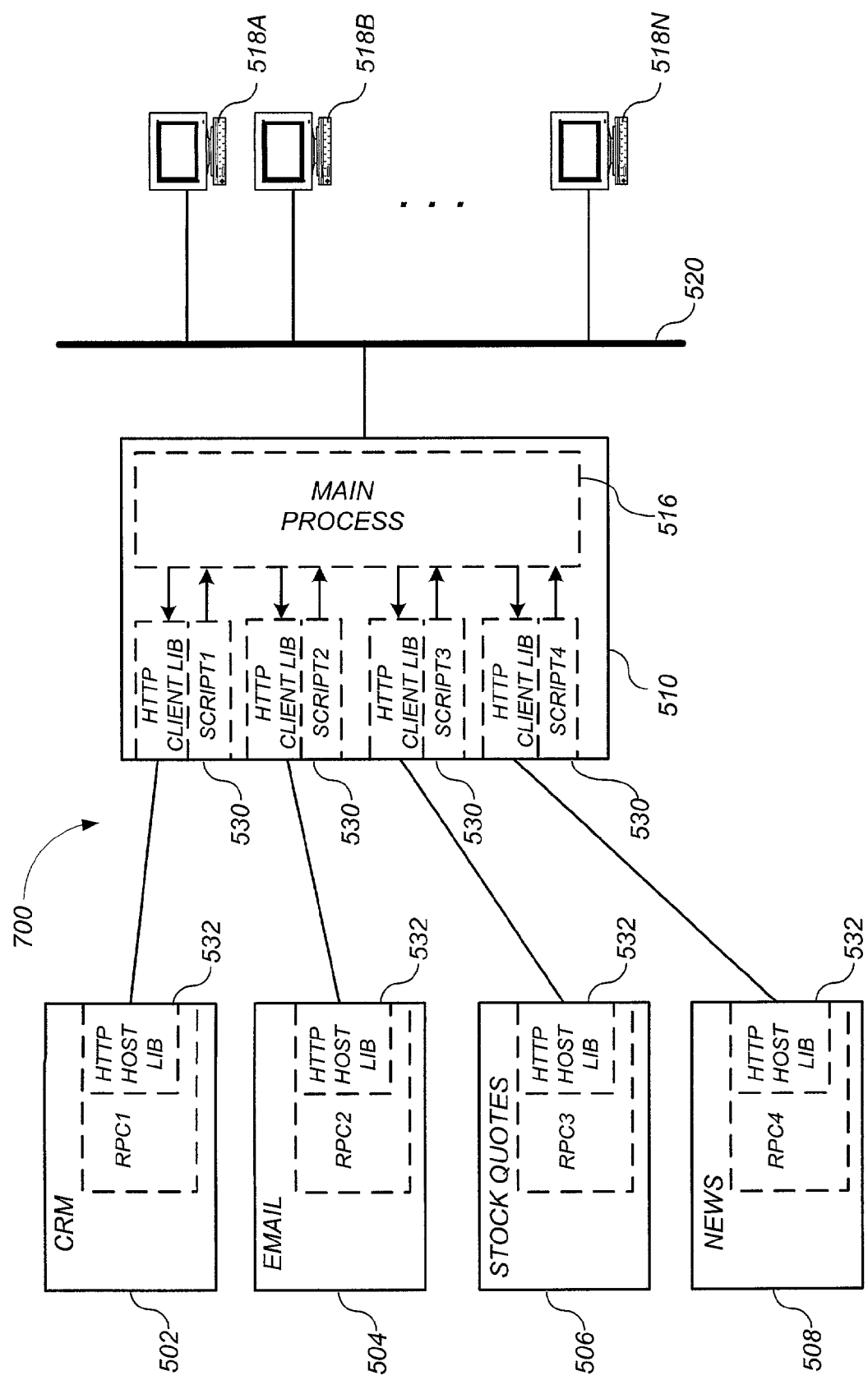
FIG. 7 shows a system for delivering personalized content according to one implementation.

FIG. 7 shows a configuration 700 according to another implementation. According to this implementation, the scripts execute at the main server 510, and the RPCs execute at the component servers 502-508.

Figure 8:
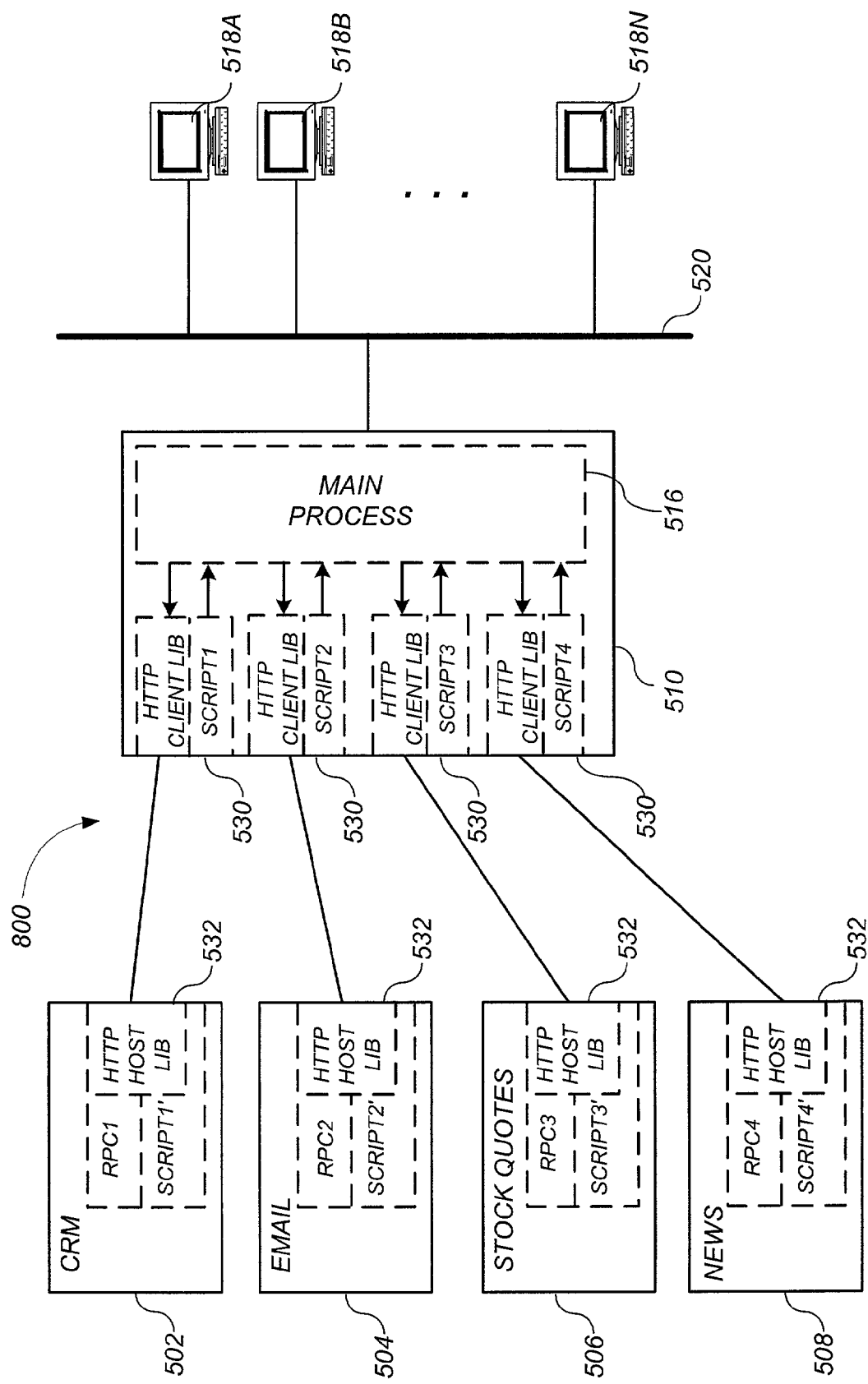
FIG. 8 shows a system for delivering personalized content according to one implementation.

FIG. 8 shows a configuration 800 according to an implementation featuring split scripts. According to this implementation, each script is split into two scripts, with one script executing at the component server and the other script executing at the main server.

Referring to FIG. 8, script SCRIPT1 located at main server 510 operates together with script SCRIPT1' and remote procedure call RPC1 located at CRM server 502 to retrieve CRM content. Script SCRIPT2 located at main server 510 operates together with script SCRIPT2' and remote procedure call RPC2 located at email server 504 to retrieve email content. Script SCRIPT3 located at main server 510 operates together with script SCRIPT3' and remote procedure call RPC3 located at stock quotes server 506 to retrieve stock quotes content. Script SCRIPT4 located at main server 510 operates together with script SCRIPT4' and remote procedure call RPC4 located at news server 508 to retrieve news content. Main process 516 assembles the retrieved content components to form a personalized Web page, and sends the personalized Web page to the user.

Each user can request a personalized set of content components from main server 510, including at least some content that is specific to the user (such as e-mail). Main server 510 then issues information requests for these components to the appropriate component servers 512-518, which concurrently generate the requested content components. Immediately after a component has been generated by its component server, the component is sent via a standard network protocol to main server 510. After either all of the components have been generated and communicated, or a specified timeout period has elapsed, main server 510 assembles the generated components into a unified body of content, and serves this content to the client system from which the original request was issued.

The Main Server

Throughout this description we refer to a single computer as the "main server." It should be noted that the word "server" typically refers to a computer responsible for serving requests from user terminals, and little else. However, main server 510 also functions as a client to other servers; in this description these other servers are referred to as "content component servers" or simply "component servers." These servers, in turn, may function as clients to yet other servers.

The characteristic that distinguishes the main server from any other servers that are involved is that the main server is the entry point to the entire system. In some implementations multiple main servers are used to meet the needs of a large number of users. In this case, all of the main servers used are similar. Load balancing software or hardware is used to distribute client requests among the available main servers. Also, substantially all of these main servers share a database of information. In this way, the state of the system is indistinguishable to users, regardless of which main server they are interacting with on any particular occasion.

An HTTP Implementation

One implementation uses the HTTP network protocol to communicate requests for content from user terminals to the main server, and from the main server to the component servers. One implementation also uses the HTTP protocol to communicate content from the component servers to the main server, and from the main server to the user terminals. HTTP offers the advantage of being the most widely used protocol. The HTTPS network protocol could also be used to implement a more secure system. The HTTPS protocol encrypts information during transmission and therefore offers greater security than the HTTP protocol.

In one implementation, the main server communicates with one or more user terminals and a plurality of component servers over TCP/IP connections established over a network. This system is suitable for implementing HTTP-based network services. The HTTP protocol is described in detail in "Hypertext Transfer Protocol—HTTP/1.0," Network Working Group, May 1996.

Network Setup

Now system 500 is discussed in greater detail. While this discussion is directed to system 500, it also applies to other implementations, as will be apparent to one skilled in the relevant art after reading this description. Referring again to FIG. 5, multiple user terminals 518 make requests of a single main server 510. These requests can be issued at any time. Main server 510 makes requests of multiple component servers 502-508. It is the responsibility of main server 510 to determine when to make a request, to which component server a request must be made, and the exact form of the request.

Client computers 518 issue requests to main server 510. Main server 510 issues requests for content components to component servers 502-508. Component content is sent from the component servers to the main server. Main server 510 is responsible for assembling content components, and sending this assembled and processed content to user terminals 518.

For example, a user on a user terminal requests an update of his personal collection of content components. This request can be made by directing a standard Web browser capable of making HTTP requests to an URL. This URL represents the location from which all users of this example system obtain assembled content. Appended to this URL is the ID of the particular user making the request, for example http://MainServer/portal.asp?UserID=213. Standard session management techniques that are well-known to those of ordinary skill in the art are used to associate a particular user with a session on the Web server. Web development environments such as Active Server Pages ("ASP") and Java Server Pages ("JSP") manage session state automatically. In one implementation, all users of this system visit the same URL for updated content, but to each URL is appended a distinct user ID. In this example the ID 213 is associated with the user making the request. The main server receives a request and extracts the ID of the user that made the request. From this ID, the main server knows which user is making the request. In previous interactions with the main server, the user has specified which content components this user wishes to view. The main server is responsible for obtaining and storing this information. In one implementation, the main server provides an HTML form allowing users to select the components they wish to view from a library of components. In this example, suppose that the user that issued this request wishes to view content components A, B, and C. The main server knows that content component A can be obtained at the URL http://CS1/A.asp, content component B can be obtained at the URL http://CS2/B.asp, and content component C can be obtained at the URL http://CS3/C.asp. In this case, each content component is housed on a separate component server: CS1, CS2, or CS3. But it could be the case that multiple content components are housed on the same component server. Also, these component servers could be physically located on the same local network as the main server. Component servers could also be located on a network physically separated from that of the main server. The HTTP communication protocol allows for communication between remote computers. In one implementation, the system administrator registers the content component with the main server by specifying the URL. In this implementation, the URL is stored in a relational database.

The main server then proceeds to request in parallel updated content components from these URLs. The component servers then concurrently generate their components. In some cases, the applications feeding these component servers generate HTML natively. In other cases, the component servers convert (for example, translate) the initial non-HTML content into HTML content. The component servers then post the content of these components back to the main server. The main server then receives these components, and assembles them into a unified body of content. If a component received by the main server complies with the HTML format, then the main server simply splices this component's content into a table element within a complete HTML page. Within this table, other content components are spliced into other table elements. If a received component complies with the XML format, then the main server applies an XSL style sheet to transform the XML into HTML which could then be treated just like an HTML component, and spliced into a table element. Once assembled, this table is then posted back to the user terminal from which the original request was issued. Note that the response (for example, table) is not limited to the HTML format; the response could also present data in any other mark-up or display language including, but not limited to, WML, HDML, or VoiceXML.

Parallel Requests

FIGS. 9-12 depict the issuing of parallel requests according to one implementation. In this implementation, A main server 902 issues requests in parallel, and waits either for the arrival of responses from all of the component servers 904, or for the timeout period to expire.

Figure 9:
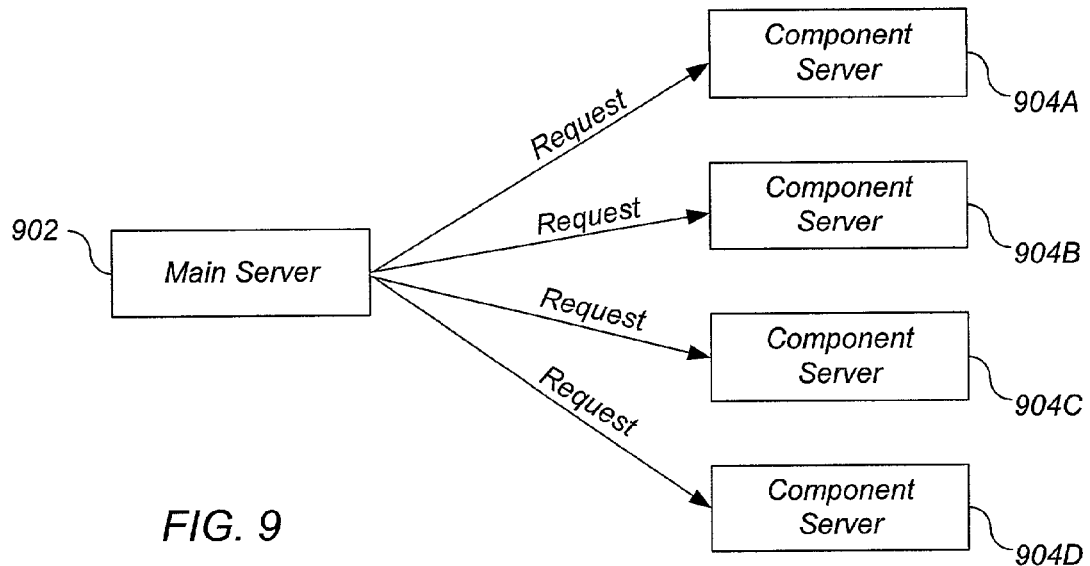
FIGS. 9 and 12-14 depict the issuing of parallel requests according to one implementation.

In the first step of this example, as shown in FIG. 9, main server 904 issues four requests to four component servers 904A, 904B, 904C, and 904D. In one implementation, the issuing of requests is implemented as follows: the main thread of execution spawns four worker threads, one worker thread for each request. Each worker thread executes a process that obtains both the length of the timeout period for its particular request, and the specific request to be made. Each worker thread then issues its request. In another implementation, a single process obtains both the specific request to be made and the length of the timeout period for each request. The process then issues the requests in a rapid sequence.

In one implementation, the worker threads or processes each use a standard HTTP client library to issue requests. Some possible HTTP client libraries that could be used for this step are WinInet, libwww, or JDK. These libraries offer similar functionality. Each of these libraries offers functions that take a URL as an argument and return content downloaded from that URL. The particular client library which would most likely be used for a given implementation of this invention depends on the platform on which the main server is implemented. For example, if the main server operates on Windows NT, then the WinInet library would most likely be used.

It may be advantageous to create a customized HTTP client library that makes more efficient use of the host system's available resources. The standard libraries listed above are optimized for communications involving a single-user client application, rather than a multi-user application functioning as both a client and a server. A customized HTTP library could create several efficiencies. It might reduce the number of worker threads the main server requires to maintain HTTP connections. It might reduce the number of times network connections need to be opened and closed. It might increase speed by optimizing network address lookups.

It should be noted that an HTTP client library designed for multi-user, multi-server environments would have benefits beyond the aggregation of content on a personalized Web page. It would be useful in any situation where parallel processing of HTTP requests is desirable. Examples might include, but would not be limited to, issuing query requests to multiple query engines, aggregating feeds from XML-generating applications, or batch-posting data to a large number of Web-based forms simultaneously.

The following is a description of one implementation of such an HTTP client library. In this description, the term "user" refers to a programmer using the client library to write software programs.

The HTTP client library defines following basic objects:

HTTPRequest—This is the only user-level (that is, normally accessed by the user of the HTTP client library) object in the library. It encapsulates basic HTTP protocol methods/properties (such as header/body creation, sending actual request to the server, decoding server response, and the like). Unlike existing requests in existing HTTP client libraries, it has the capability to be linked with other HTTPRequest objects in a chain, which can be processed from the user perspective as a single HTTPRequest (work is done on all requests in parallel, from the user's perspective).

AddrResolver—Internal object, responsible for resolving URL into corresponding InetHost objects. AddrResolver maintains a cache of InetHost objects (allocates duplicate objects if necessary; frees those which are not being used). It also handles Web Proxies.

InetHost—Internal object, encapsulating a Web server. Responsible for establishing/terminating TCP/IP connections to the server, handling SSL, and tunneling Web proxies.

Here is how the objects are typically used:

1. Create a new HTTPRequest object, specifying HTTP method and target Web server.

2. Add necessary HTTP headers to the request.

3. Add HTTP body, if necessary.

4. (optional, repeat as needed) Repeat steps 1-3, link new request to the request previously created.

At this point we have a chain of the requests, containing one or more HTTPRequest objects.

5. Invoke Process( ) method on the first HTTPRequest object, specifying desired timeout value. The method returns if either of following conditions are requests in the chain are met: a) All requests in the chain are finished. b) Timeout expires.

Throughout this process, an HTTPRequest object is in one of five request states:

1. NEW
2. WAITING FOR HOST
3. SENDING TO HOST
4. RECEIVING DATA
5. FINISHED

The following pseudo-code details the Process( ) method:

```
while (not all requests are finished and timeout not expired) do
{
    for each request in a chain
    {
        switch (state of the request)
        {
        case "New":
            change state to "Waiting for host" (makes request uneditable)
            break
        case "Waiting for host":
            If (the host, corresponding to the request's UIRL is not immediately available)
            {
                Try to obtain a connection (socket) to the local address resolution server.
                If successful, send an address resolution request to it.
            }
            else
            {
                try to obtain a connection (socket) to corresponding web server (possibly
                through proxy)
                change state to "Sending to host"
            }
            break
        case "Finished":
            Remove request from the chain
            break
        }
    }
    if (any connection (socket) is ready to be used) (this check is done simultaneously on all
    connections)
    {
        for each request, corresponding to "ready to be used"connection
        {
            switch (state of the request)
            {
            case "Waiting for host":
                release connection to the local address resolution server
                break
            case "Sending to host":
                send HTTP data to the component server
                change request state to "Receiving data"
                break
            case "Receiving data":
                receive response data from the component server
                release connection to the component server
                change request state to "Finished"
                break
            }
        }
    }
}
```

In one implementation, a technique referred to herein as "connection pooling" is employed. According to this technique, a socket used for an HTTP request is not automatically discarded after the response to the HTTP request is received. Instead, the socket is cached in a "connection pool" for a period of time. The Process( ) method attempts to use these sockets for subsequent HTTP requests by using the host name and port number of the HTTP request as the key to the cache. Some implementations use a separate connection pool for secure HTTP requests.

Figure 10:
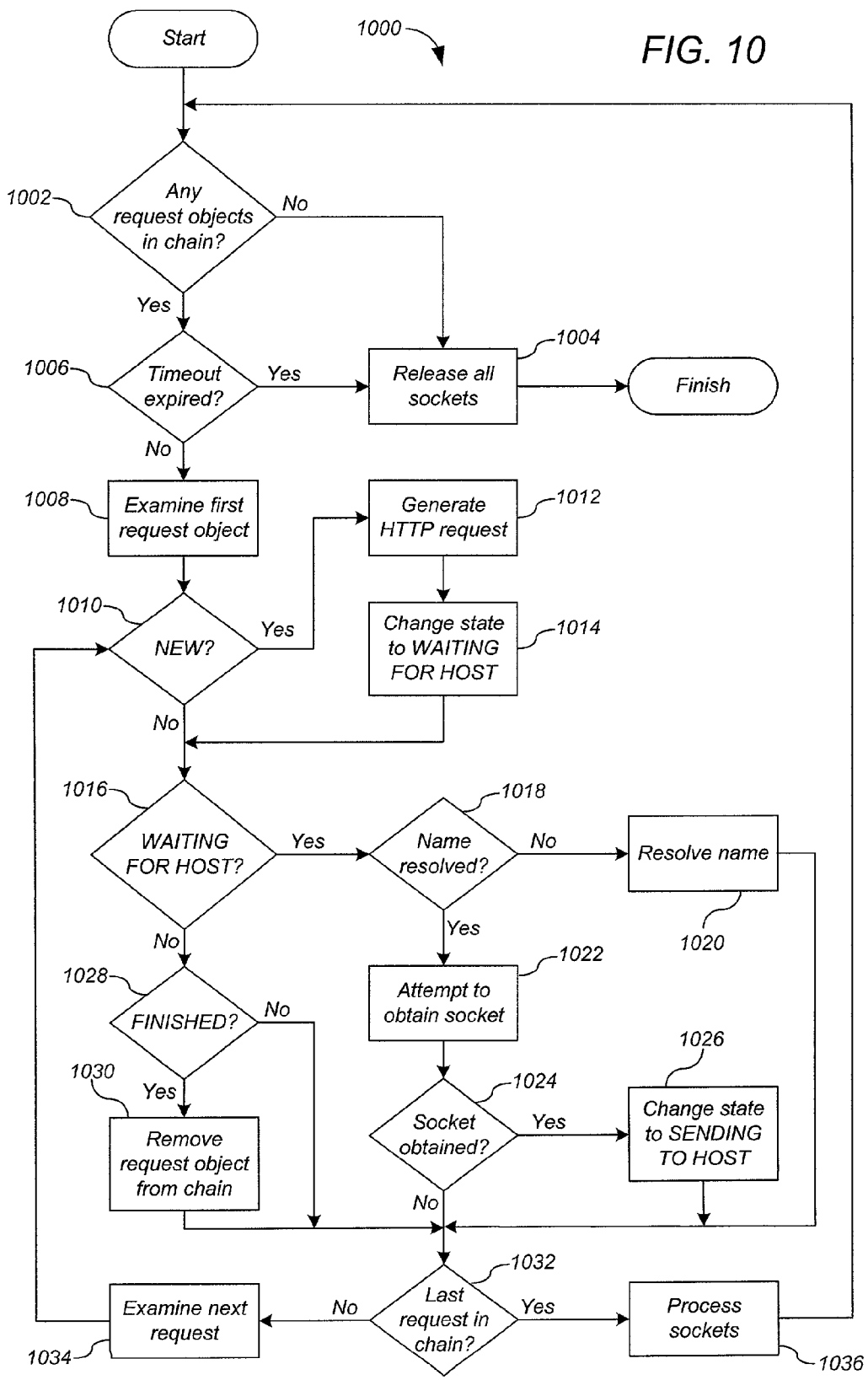
FIG. 10 is a flowchart showing a process for processing the requests according to one implementation.

FIG. 10 is a flowchart showing the Process( ) method according to one implementation 1000. At the point at which the Process( ) method is invoked, a chain of HTTPRequest objects has been created. In one implementation, the chain is implemented as a linked list of the HTTPRequest objects. Associated with each object in the chain is a single component server responsible for serving the request. In some implementations, the HTTPRequest objects in the chain represent the information components required to satisfy a request for a personalized Web page. In other implementations, the HTTPRequest objects in the chain represent information components required to satisfy other collections of requests for content components.

Process 1000 first determines whether there are any HTTPRequest objects in the chain (step 1002). If not, then process 1000 releases all of the sockets (step 1004), and finishes. If any HTTPRequest objects remain in the chain, process 1000 determines whether a predetermined timeout period has expired (step 1006). If the timeout period has expired, then process 1000 releases all of the sockets by returning the sockets to the connection pool (step 1004), and finishes. If the timeout period has not expired, then process 1000 examines the first HTTPRequest object in the chain (step 1008). In one implementation, each HTTPRequest object is a state machine having the multiple states described above.

If the state of the HTTPRequest object is NEW (step 1010), then the process generates an HTTP request by completing the HTTP headers of the HTTP request (step 1012), and changes the state of the HTTPRequest object to WAITING FOR HOST (step 1014). An http request is a set of headers that specify parameters of the message. Some of the parameters are set by the HTTPRequest object, such as message length, while others are set by the main server, such as what is sent, where it is sent, form of the reply, and the like.

If the state of the HTTPRequest object is WAITING FOR HOST (step 1016), process 1000 determines whether the name of the component server has been resolved (step 1018). If the name of the component server has not been resolved, process 1000 resolves the name of the component server (step 1020). In one implementation, process 1000 resolves the name of the component server by contacting a local name resolution server. In some implementations, sockets to the local name resolution are cached in the connection pool in the same way that sockets to the component servers are cached.

Process 1000 then determines whether any HTTPRequest objects remain in the chain (step 1032). If any HTTPRequest objects remain in the chain, then process 1000 examines the next HTTPRequest object in the chain (step 1034). If no HTTPRequest objects remain in the chain, then process 1000 processes the sockets for the HTTPRequest objects (step 1036).

However, if at step 1018, the name of the component server has been resolved, process 1000 attempts to obtain a socket connecting to the component server (step 1022). Process 1000 attempts to obtain a socket to the component server from the connection pool. If the connection pool contains no socket to the component server, process 1000 attempts to create a new socket to the component server. Process 1000 then determines whether a socket was obtained (step 1024). If a socket was obtained, process 1000 changes the state of the HTTPRequest object to SENDING TO HOST (step 1026) and adds the socket to a ready list. The ready list includes sockets that are ready to be written with outgoing data, such as the socket added to the list in step 1026, and sockets with incoming data ready to be read, as is well-known in the relevant arts. Process 1000 then resumes at step 1032.

If the state of the HTTPRequest object is FINISHED (step 1028), process 1000 removes the HTTPRequest object from the chain (step 1030). Process 1000 then resumes at step 1032. If the state of the HTTPRequest object is not WAITING FOR HOST, SENDING TO HOST or FINISHED, process 1000 resumes at step 1032.

Figure 11:
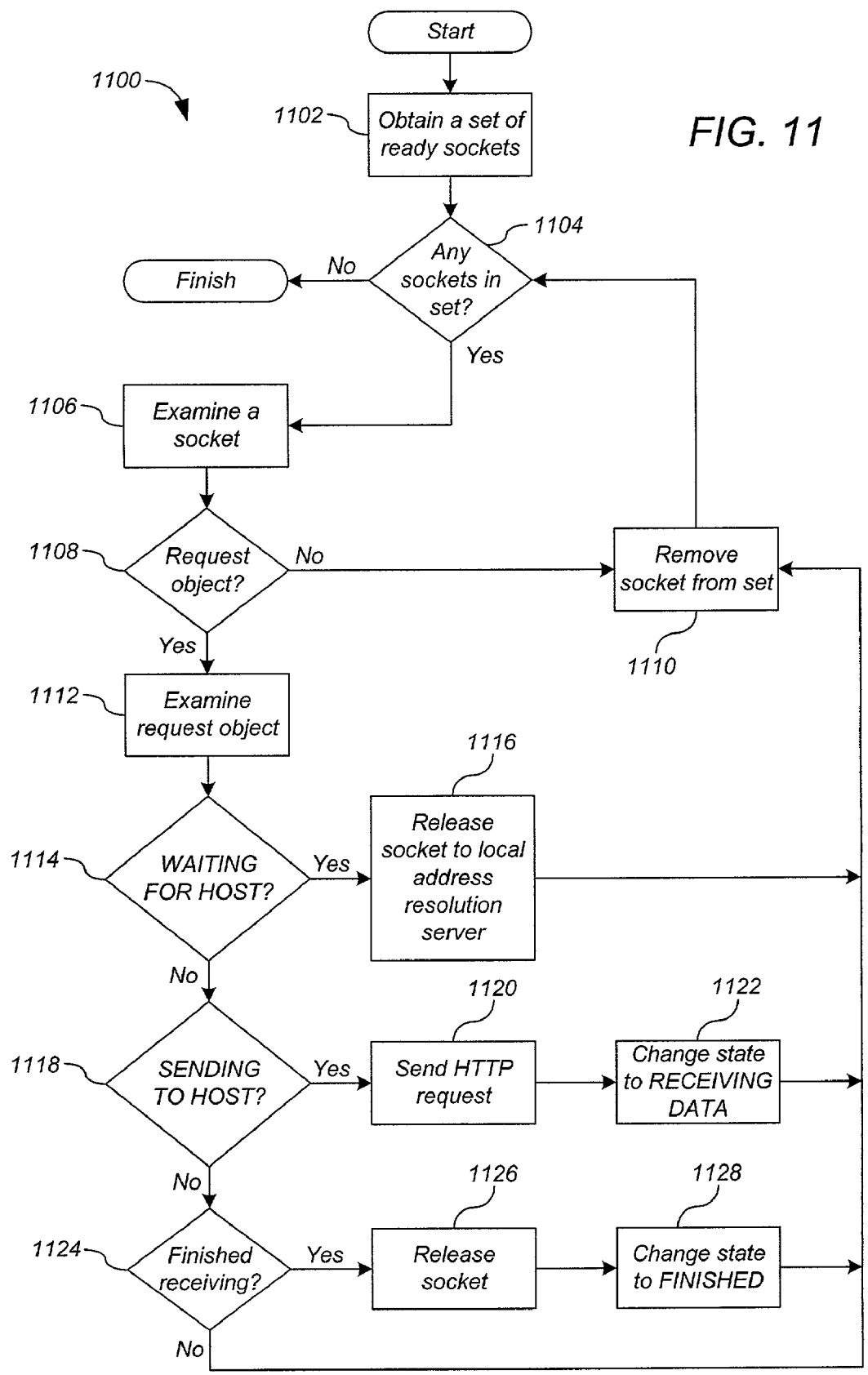
FIG. 11 is a flowchart showing a process for processing sockets for the requests according to one implementation.

FIG. 11 is a flowchart showing a process 1100 for processing sockets according to one implementation. In one implementation, process 1100 is employed during step 1036 of process 1000. Process 1100 obtains a set of ready sockets (step 1102). In one implementation, the set of ready sockets includes the sockets added during step 1026 of process 1000. Process 1100 determines whether there are any sockets in the set (step 1104). If not, process 1100 finishes. But if there are any sockets in the set, process 1100 selects one of the sockets (step 1106), and determines whether there is a HTTPRequest object that corresponds to the selected socket (step 1108). If not, the selected socket is removed from the set (step 1110), and process 1100 resumes at step 1104. But if there is a HTTPRequest object that corresponds to the selected socket, process 1100 examines that HTTPRequest object (step 1112).

If the state of the HTTPRequest object is WAITING FOR HOST (step 1114), process 1100 releases the socket to the local address resolution server by returning the socket to the connection pool (step 1116). The socket to the component server is then removed from the set of ready sockets (step 1110), and process 1100 resumes at step 1104.

If the state of the HTTPRequest object is SENDING TO HOST (step 1118), then process 1100 sends the HTTP request corresponding to the HTTPRequest object to the component server identified by the request (step 1120), and changes the state of the HTTPRequest object to RECEIVING DATA (step 1122). The socket is then removed from the set (step 1110), and process 1100 resumes at step 1104.

If the state of the HTTPRequest object is neither WATING FOR HOST nor SENDING TO HOST, then the state of the HTTPRequest object is RECEIVING DATA. In this case, process 1100 determines whether all of the data has been received for the HTTPRequest object (step 1124). If not, the socket is removed from the set (step 1110), and process 1100 resumes at step 1104. But if all of the data has been received for the HTTPRequest object, process 1100 releases the socket by returning the socket to the connection pool (step 1126), and changes the state of the request to FINISHED (step 1128). The socket is then removed from the set (step 1110), and process 1100 resumes at step 1104.

Further elaboration on the use of the term "parallel" is needed. It should be noted that a single-processor server supporting multiple threads of execution devotes some amount of processing time to a particular thread before performing a context switch, during which computing resources are handed over to another thread. At some point during the execution of each of the worker threads described above, the thread will call upon the HTTP client library to make an HTTP request of the appropriate component server. Computing resources may then be switched over to another worker thread which may then execute its HTTP request. When examined on this level of detail it may be noted that the HTTP requests are not, in fact, issued in parallel, but instead are issued sequentially but extremely rapidly. However, examining the system on a more general and functional level, reveals that the amount of time that elapses between the issuing of HTTP requests to component servers is negligible in contrast to the amount of time likely consumed by the round-trip transmission of HTTP requests to and from the component servers, added to the amount of time consumed by the generation of content by component servers. For example, assuming the worker threads are spawned at approximately the same time, and the platform hosting the main server switches context every 100 microseconds (10-6), using a round-robin scheduling algorithm which distributes computing resources evenly amongst threads, multiple HTTP requests for content components are likely to be issued within one $1/1000^{th}$ of a second. The time for HTTP requests to travel across the local network to component servers could be as little as $1/1000^{th}$ of a second, but sending HTTP requests could also take multiple seconds. The amount of time consumed by this step is largely unpredictable because of fluctuations in network conditions. It should also be noted that component servers are not necessarily located on the local network, in which case even greater variability in the amount of time needed for request transmission is introduced. Turning to the generation of content itself, the least amount of time required to generate content is roughly $1/1000^{th}$ of a second to generate a static HTML page, but in general, the generation of content components will require substantially more time. Again, the amount of time consumed by this step is largely unpredictable. In summary, the amount of time between the issuing of HTTP requests to component servers is of short and consistent duration, whereas the amount of time required for request transmission and component generation varies greatly and unpredictably from component to component, and may take an arbitrarily long period of time. Immediately after HTTP requests are issued the requested content components are truly generated in parallel. For this reason, we use the term "parallel" to describe the entire process of issuing requests for content components, even if a particular implementation of this system is not capable of issuing HTTP requests in parallel. A similar analysis applies to implementations that employ a single process to issue the requests in a rapid sequence.

Figure 12:
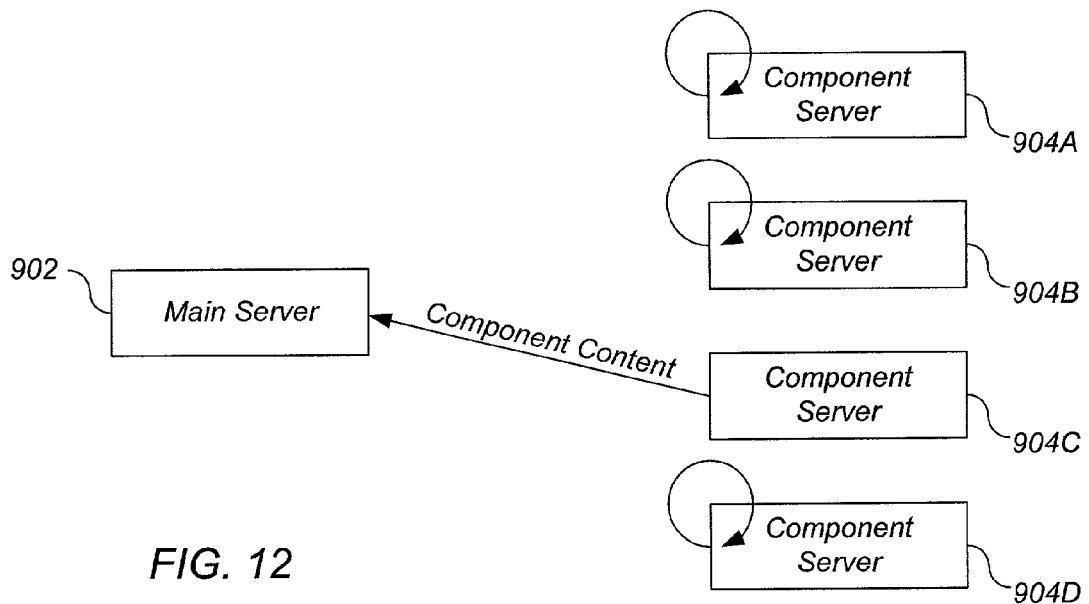

Referring to FIG. 12, the second step is an intermediate point in the processing of the requests. At this point, all requests for components have been issued. Component server 904C has finished processing its request, and has accordingly returned the resulting content component. Main server 902 receives this content component, stores it, and awaits for remaining content components to be returned. The remaining component servers 904 are still processing their respective requests.

Figure 13:
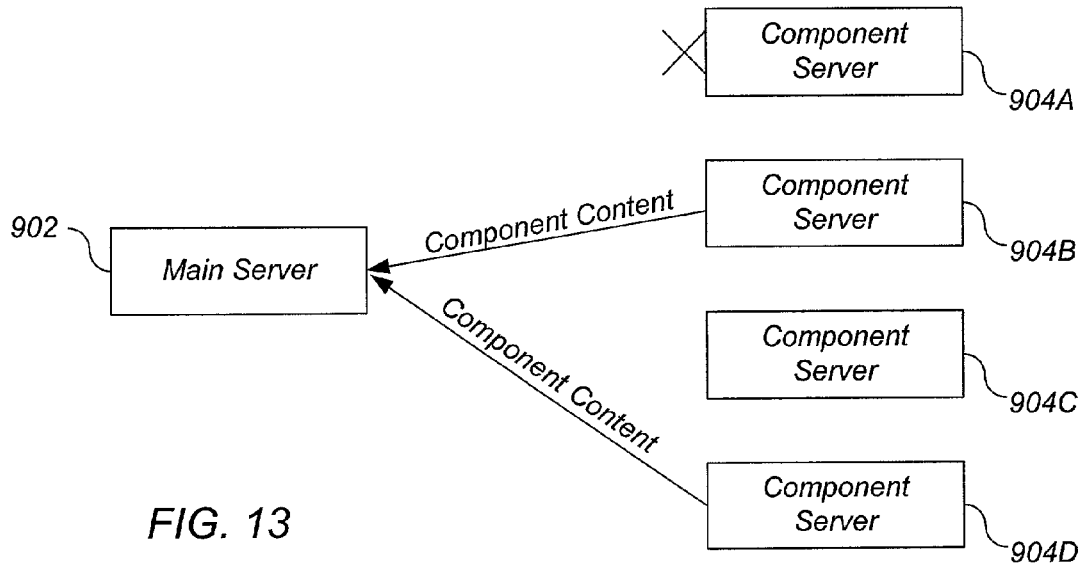

Referring to FIG. 13, the third step is the final point in the processing of the requests. Servers 904B and 904D complete their requests and return the resulting components. Component server 904C has previously finished. Component server 904A encounters a serious error and is unable to communicate any response at all to the main server.

Figure 14:
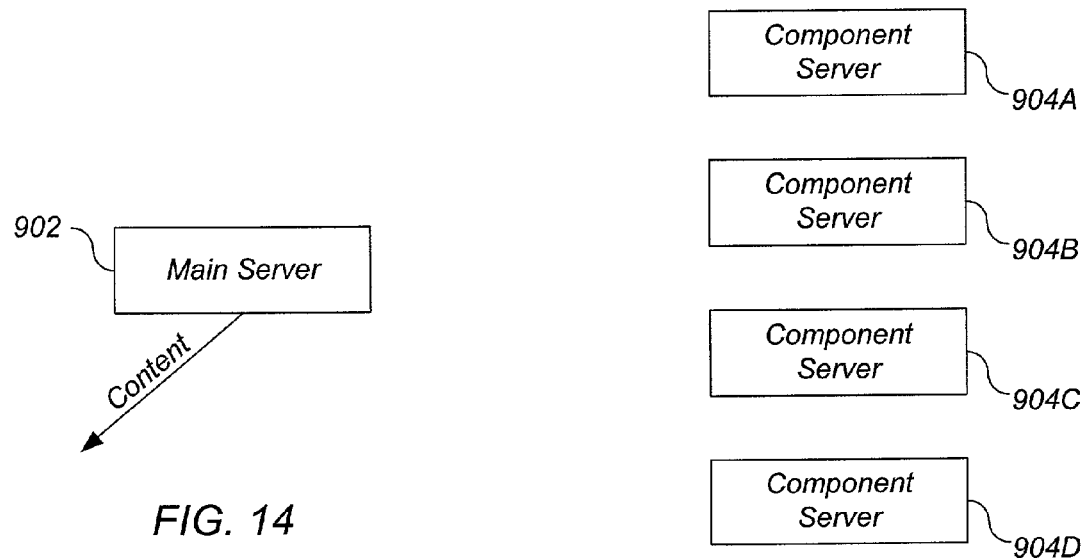

Referring to FIG. 14, in the fourth step main server 902 communicating the resulting content, processed and assembled, to the user terminal from which the original request was issued. This content is assembled from components generated by component servers 904B, 904C, and 904D. In this example, main server 902 needed to wait the full duration of the timeout period before assembling content because component server 904A was unable to respond. If component server 904A had been able to respond with an error message, then main server 902 could have proceeded to assemble and return content before the end of the timeout period.

Generating multiple content components in parallel can require much less time than generating the same components sequentially. As opposed to generating all content on a single server, offloading the generation of content components to separate component servers allows for more flexibility and stability in several ways.

Each component server can be configured to optimize the generation of its content component. This might include running intensive applications that should not run on the main server for performance reasons.

For example, a content component that provides an interface to a database application may need to run on the same computer hosting the database application. Saving and retrieving records to and from a database requires CPU processing and memory usage, and possibly disk input and output. If the database application were hosted by the same computer hosting the main server, then all of these operations would have a substantial negative impact on the performance of the main server. Offloading component generation from the main server to a specialized component server allows for the isolation of such applications. It also allows conversion of data from one format to another, which often requires substantial processing power, to take place on a separate server.

Any error encountered generating a content component only affects components generated by the same component server; other components are unaffected, and more importantly, the main server is unaffected.

Associating Users with Components and Preferences

In one implementation, the main server determines which user is making the request on the user terminal through some form of user authentication. Prompting the user to enter a username and password is a common method of authenticating user identification. Other more secure methods might include retinal scanning or voice pattern analysis. Another option for user authentication is to allow the operating system running on the user terminal to perform the authentication. All multi-user computer systems have some means for determining users' identities and, as far as this invention is concerned, the means are functionally equivalent.

Identifying the user making a request allows for greater granularity in terms of security and presentation of content. Identifying the user making a request also allows individual users to store their preferences with the system. A user's preferences might include a list of that user's desired content components, as well as that user's display preferences for each component. In this case, the preferences of the particular user accessing the system play a role in determining which component servers are issued requests by the main server. In this case, the preferences of a particular user might also determine additional information that is sent to a component server along with the request for a component, further specifying to the component server how to generate a component.

For example, user identification may be communicated from the main server to a component server generating a particular component, allowing for the generation of personalized or secured content. In the example presented above, in which a content component displays a user's email messages, the content component would need to have the identity of the user making the request. This implementation allows each user of the system to see a distinct set of components, with each component appearing in accordance with each user's preferences, without requiring users to specify this information along with each request.

The Process of Collecting Content

Figure 15:
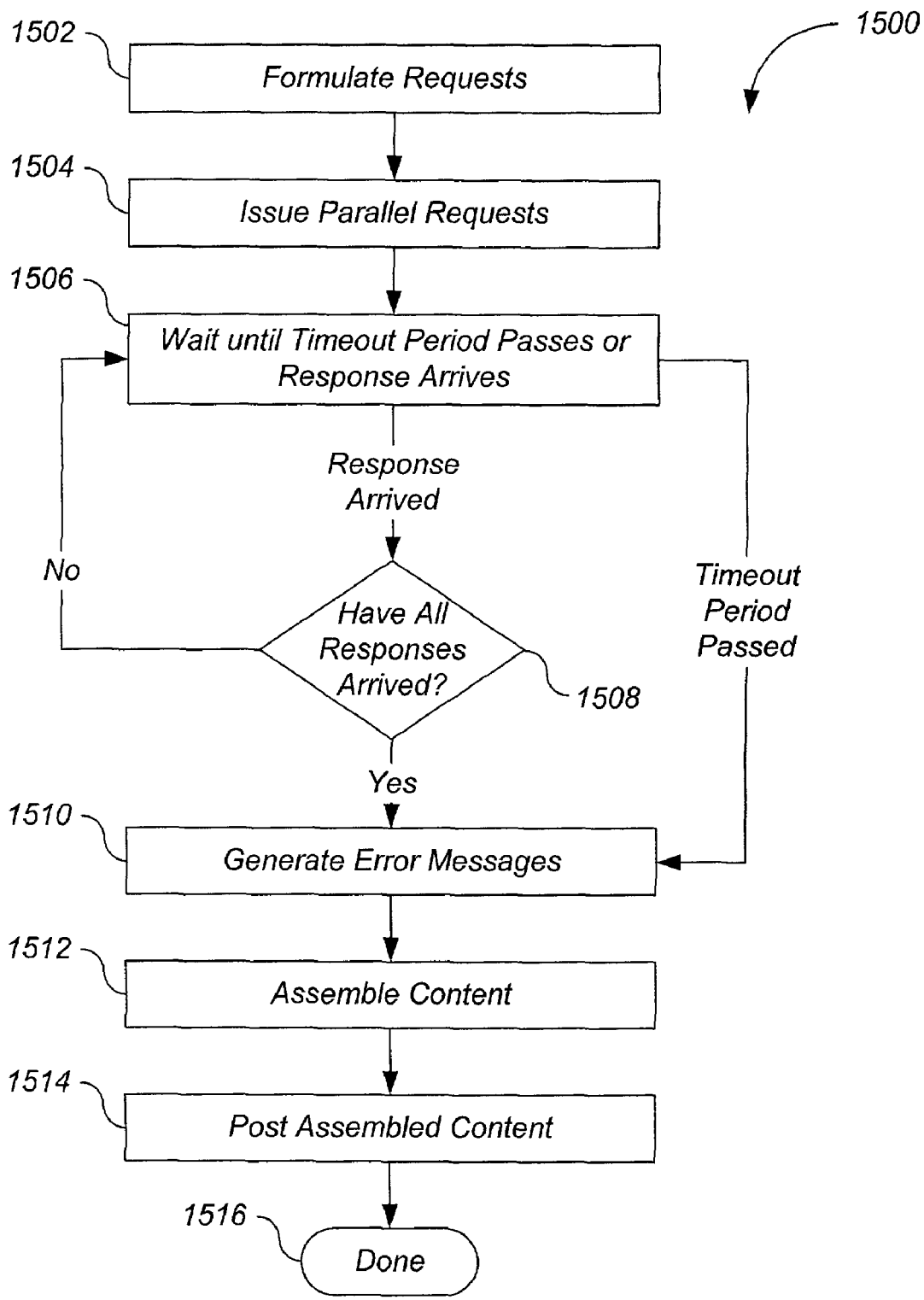
FIG. 15 shows a process used by the main server to assemble a collection of content according to one implementation.

FIG. 15 shows a process 1500 used by the main server to assemble a collection of content according to one implementation. This process is executed whenever the main server needs to ensure that every component within a set of components requested by a user is up to date.

One implementation employs a data caching strategy that prevents the main server from needing to execute process 1500 every time a client makes a request. Such a strategy can greatly reduce the amount of time needed to fulfill a user's request. An effective data caching strategy is tailored to each content component because it is likely that different components will need to be cached differently. An effective caching strategy also examines the user's preferences for each cached component. For example, a user requests component A with preference A1. The main Web server fulfills this request by issuing a request to the appropriate component server. The component server processes this request and returns the resulting content component to the main server. The main server then caches the content returned by the component server, indexed by the preference A1 that was included in the request sent to obtain the content, and proceeds to return the content to the user that initiated the request. If, at a later time, a user requests component A with preference A1, then the main server can quickly return the previously cached content, without needing to contact the component server that previously generated that content. If a user requests component A with preference B1, however, then the main server needs to contact the appropriate component server because it is possible that the content generated using preference B1 would be different than the previously cached content. One implementation also allows an administrator of the system to specify the length of time a particular component's content is stored in the cache. This is useful because it may be appropriate to store different components for different lengths of time. Components that change frequently should not be stored in the cache for long. For example, a component that opens a frequently changing database, extracts information, and displays this information should not be cached for long because it is likely that components returned from the cache do not accurately reflect corresponding components that would be generated by the component server. Components that don't change at all should be cached for as long as possible. For example, a component that displays a link to a useful Web page should be cached for as long as possible. It may also be the case that some components should not be cached at all. One implementation allows an administrator to turn caching on and off for a particular component.

Returning to FIG. 15, process 1500 formulates the requests to be issued to the component servers (step 1502). Process 1500 determines which component servers need to be made requests of, and the forms of the requests that need to be made. For example, each user may be able to request an arbitrary set of content components for inclusion in a page. Process 1500 determines which components the user has chosen. In one implementation, users' choices of components might be stored in a relational database.

Figure 16:
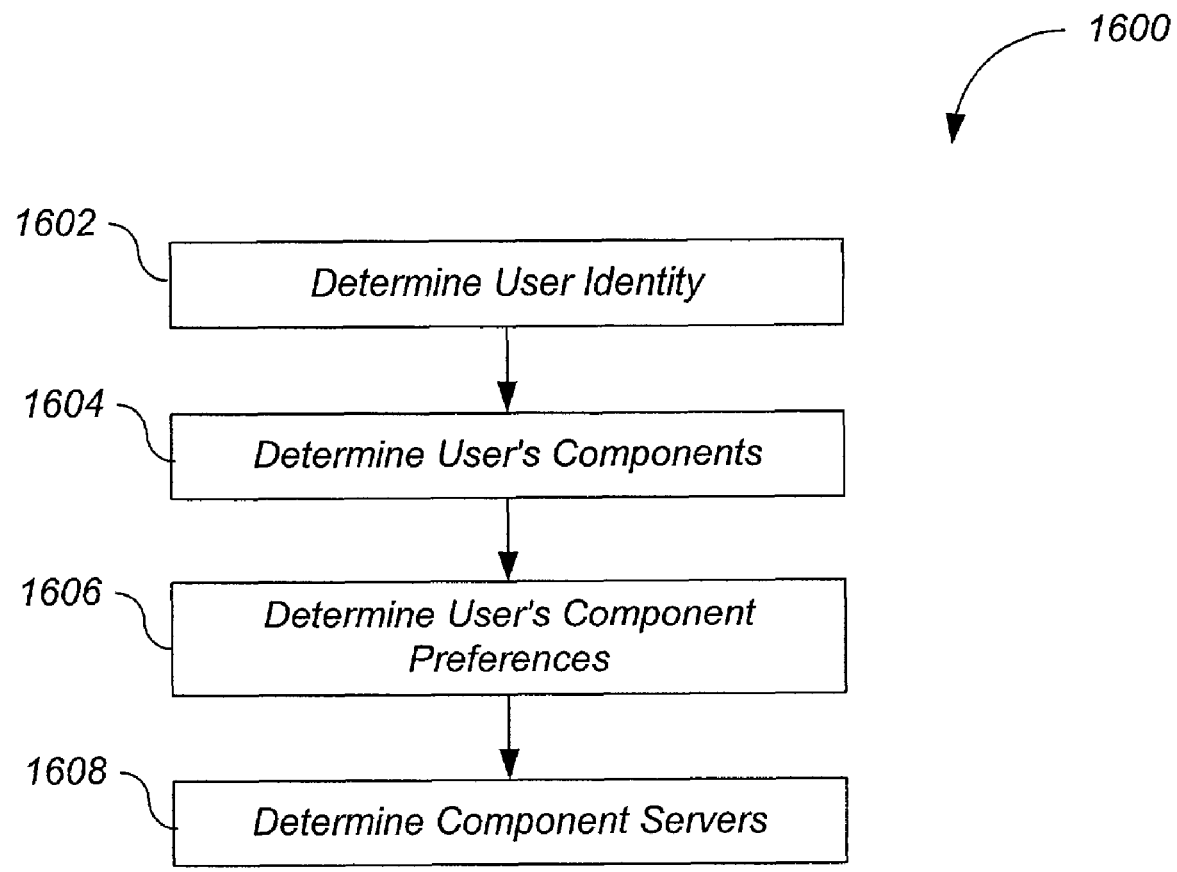
FIG. 16. shows a process used by the main server to formulate the requests to be issued to the component servers in accordance with one implementation.

In one implementation, step 1502 includes the process 1600 described in FIG. 16. Process 1600 determines the identity of the user issuing the request (step 1602). This information can be obtained and validated through a login/password request, or any other form of user authentication, as described above.

Process 1600 also determines which components the user wishes to view (step 1604). This list of components can be retrieved from a database of information previously obtained from the user. This process allows for the association of every user with a set of content components. This allows users to automatically see the desired components without needing to specify these components for every session. This association also allows users to see the correct components regardless of which user terminal they use to access the system.

Process 1600 also determines the user's display preferences for each component requested (step 1606). This information can also be retrieved from a database of information previously obtained from the user.

Process 1600 also determines which component servers are responsible for generating the requested components (step 1608). It is possible that multiple component servers are capable of generating a single component. It is also possible that the user's preferences obtained for a component determine which component server is responsible for generating the component. For example, a single component may be capable of displaying information from one of two databases. It is the user's preference which database of information to view. One copy of the component is located on a component server that can conveniently access one of these databases, and the other copy of the component is located on a component server that can conveniently access the other database. In this case, each user's display preference for this component determines which component server is contacted by the main server.

Returning to FIG. 15, once the necessary requests have been formulated and it has been determined to which component servers these requests need to be issued, process 1600 issues the requests in parallel (step 1504). The significant characteristic of requests being issued in parallel is that the main server does not wait for a response from one request before sending the next request. As discussed above, it may be that when examined on an arbitrarily high level of detail the requests are actually issued sequentially. It may also be that these request are in fact issued in parallel. This will vary from implementation to implementation, as different computer systems and networks have different capabilities, but the significant characteristic of this step is that the main server issues requests as quickly as possible, without waiting for responses. Issuing requests quickly, without waiting for responses allows each component server to begin generating the requested component as soon as possible, and in parallel with the other component servers generating components.

Once all of the requests have been issued, process 1500 waits for a response from any one of the component servers (step 1506). There is preferably an arbitrary timeout period specified by a system administrator. The main server waits no longer than this period for all responses to arrive. The length of this timeout period can be set by individual users, or it can be a system-wide value. Using a timeout period prevents the main server from waiting indefinitely if any component server, for any reason, does not respond to a request.

In one implementation, process 1500 instantiates a timer after sending an information request to a component server. If no response is received from that component server prior to a timeout period of the timer, process 1500 immediately establishes the response from that component server as a null value, forms the personalized Web page and transmits the personalized Web page to the user terminal without waiting for that response.

If a response arrives while process 1500 is waiting, process 1500 saves this response and determines if responses have been collected from all of the requests issued (step 1508). If there are still outstanding requests, process 1500 returns to step 1506 to await another response or a timeout. If all of the requests have been satisfied, then the main server proceeds to step 1510.

Process 1500 generates error messages as needed (step 1510). It is possible for a component server to return an error message because it could not generate the component requested. It is also possible for a component server not to respond to a request at all. It is also possible for network errors to be encountered. Other types of errors may be encountered. Process 1500 may generate an error message and display this error message in the place of the absent component.

Process 1500 assembles requested components into a unified body of content (step 1512). In one implementation, components consist of formatted content that can be easily displayed in a variety of ways, including but not limited to a Web browser, a personal digital assistant, a cellular phone, or any other output device.

Process 1500 posts the assembled content to the user terminal that issued the original request (step 1514). Note that this user terminal can actually be a personal digital assistant, a television set, a telephone, or any other output device. Process 1500 is done (step 1516).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of computer code including instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. For example, although an object-oriented software implementation is discussed, other software implementations may be used, as will be apparent to one skilled in the relevant art after reading this description. Accordingly, other implementations are within the scope of the following claims.

What is claimed is:

1. A method for satisfying a single request from a client for a plurality of content components derived from content hosted by a plurality of distinct, separately accessible component servers for forming a personalized network page, comprising:
   receiving a single request specifying multiple content components derived from content hosted by the plurality of distinct, separately accessible component servers for forming the personalized network page;
   after receiving the single request, generating a plurality of information requests for the content as parallel worker threads spawned from a main execution thread;
   sending the plurality of requests as parallel or rapid sequential worker threads so that each information request is sent to the component server hosting the content corresponding to the information request before receiving a response to any of the information requests, thereby permitting concurrent generation of the content components at the component servers;
   forming the content components from the responses to the information requests including assembling the personalized network page; and
   transmitting the personalized network page including the multiple content components to the client and
   wherein the single request comprises a request for a personalized Web page; and
   wherein the forming comprises assembling the personalized Web page from the content components; and
   wherein the transmitting comprises sending the personalized Web page to the client.

2. The method of claim 1, further comprising:
   instantiating a timer after the step of sending each information request and before the step of forming the personalized web page; and
   if no response is received from one of the component servers prior to a timeout period of the timer, performing the steps of
      immediately establishing the response from that component server as a null value, and
      carrying out the steps of forming the personalized network page and transmitting the personalized network page to the client without waiting for that response.

3. The method of claim 2, wherein the information requests are transmitted according to a standard network protocol.

4. The method of claim 3, wherein the standard network protocol is selected from the group consisting of HTTP, HTTPS, WAP, and FTP.

5. The method of claim 1, wherein the component servers generate the responses in different data formats, and the method further comprises converting the responses to a common data format.

6. The method of claim 5, wherein the common data format is based on a markup language.

7. The method of claim 5, wherein the converting step is performed at the respective component servers.

8. The method of claim 5, wherein the converting step is performed at a main server, the main server also receiving the single request from the user and transmitting the personalized network page to the client.

9. The method of claim 8, wherein the main server is a corporate portal server.

10. The method of claim 8, wherein the main server is an Internet portal server.

11. The method of claim 8, wherein each of the main server and the component servers are physically separate, and wherein the information requests and responses are transmitted according to a standard network protocol.

12. The method of claim 11, wherein the standard network protocol is selected from the group consisting of HTTP, HTTPS, WAP, and FTP.

13. The method of claim 1, wherein the component servers comprise an email server, an enterprise resource planning server, or a customer relationship management server, or combinations thereof.

14. The method of claim 1, further comprising:
   generating a state machine to represent the progress of each information request; and
   recursively processing the state machines to advance the progress of each information request.

15. The method of claim 1, further comprising uniquely identifying a user who wishes to view the personalized network page regardless of which access terminal is being used.

16. The method of claim 1, further comprising caching one or more of the content components for retrieval without contacting the component server in a future request.

17. The method of claim 16, wherein the caching comprises indexing at least one of the content components according to one or more user preferences.

18. The method of claim 1, further comprising retrieving one or more previously cached content components for including in the personalized network page without contacting the corresponding component server.

19. The method of claim 18, wherein at least one of the cached content components was indexed according to one or more user preferences, and wherein the retrieving comprises calling the at least one cached content component according to the indexing.

20. The method of claim 1, further comprising providing a form allowing a user to select the components from a library of components.

21. Computer-readable media embodying instructions executable by a computer to perform a method for satisfying a single request from a client for a plurality of content components derived from content hosted by a plurality of distinct, separately accessible component servers for forming a personalized network page, the method comprising:
   receiving a single request specifying multiple content components derived from content hosted by the plurality of distinct, separately accessible component servers for forming the personalized network page;

after receiving the single request, generating a plurality of information requests for the content as parallel worker threads spawned from a main execution thread;

sending the plurality of requests as parallel or rapid sequential worker threads so that each information request is sent to the component server hosting the content corresponding to the information request before receiving a response to any of the information requests, thereby permitting concurrent generation of the content components at the component servers;

forming the content components from the responses to the information requests including assembling the personalized network page; and transmitting the personalized network page including the multiple content components to the client and wherein the single request comprises a request for a personalized Web page; and wherein the forming comprises assembling the personalized Web page from the content components; and wherein the transmitting comprises sending the personalized Web page to the client.

22. The media of claim 21, wherein the method further comprises:

instantiating a timer after the step of sending each information request and before the step of forming the personalized web page; and if no response is received from one of the component servers prior to a timeout period of the timer, performing the steps of immediately establishing the response from that component server as a null value, and carrying out the steps of forming the personalized network page and transmitting the personalized network page to the client without waiting for that response.

23. The media of claim 22, wherein the information requests are transmitted according to a standard network protocol.

24. The media of claim 23, wherein the standard network protocol is selected from the group consisting of HTTP, HTTPS, WAP, and FTP.

25. The media of claim 21, wherein the component servers generate the responses in different data formats, wherein the method further comprises:

converting the responses to a common data format.

26. The media of claim 25, wherein the common data format is based on a markup language.

27. The media of claim 25, wherein the converting step is performed at the respective component servers.

28. The media of claim 25, wherein the converting step is performed at a main server, the main server also receiving the single request from the user and transmitting the personalized network page to the client.

29. The media of claim 28, wherein the main server is a corporate portal server.

30. The media of claim 28, wherein the main server is an Internet portal server.

31. The media of claim 28, wherein each of the main server and the component servers are physically separate, and wherein the information requests and responses are transmitted according to a standard network protocol.

32. The media of claim 31, wherein the standard network protocol is selected from the group consisting of HTTP, HTTPS, WAP, and FTP.

33. The media of claim 21, wherein the component servers comprise an email server, an enterprise resource planning server, or a customer relationship management server, or combinations thereof 34. The media of claim 21, wherein the method further comprises:

generating a state machine to represent the progress of each information request; and recursively processing the state machines to advance the progress of each information request.

35. The media of claim 21, the method further comprising uniquely identifying a user who wishes to view the personalized network page regardless of which access terminal is being used.

36. The media of claim 21, the method further comprising caching one or more of the content components for retrieval without contacting the component server in a future request.

37. The media of claim 36, wherein the caching comprises indexing at least one of the content components according to one or more user preferences.

38. The media of claim 21, the method further comprising retrieving one or more previously cached content components for including in the personalized network page without contacting the corresponding component server.

39. The media of claim 38, wherein at least one of the cached content components was indexed according to one or more user preferences, and wherein the retrieving comprises calling the at least one cached content component according to the indexing.

40. The media of claim 21, the method further comprising providing a form allowing a user to select the components from a library of components.

41. An apparatus for satisfying a single request from a client for a plurality of content components derived from content hosted by a plurality of distinct, separately accessible component servers for forming a personalized network page, comprising:

means for receiving a single request specifying multiple content components derived from content hosted by the plurality of distinct, separately accessible component servers for forming the personalized network page;

means for, after receiving the single request, generating a plurality of information requests for the content as parallel worker threads spawned from a main execution thread;

means for sending the plurality of requests as parallel or rapid sequential worker threads so that each information request is sent to the component server hosting the content means for forming the content components from the responses to the information requests including assembling the personalized network page; and means for transmitting the personalized network page including the multiple content components to the client and wherein the single request comprises a request for a personalized Web page; and wherein the forming comprises assembling the personalized Web page from the content components; and wherein the transmitting comprises sending the personalized Web page to the client.

42. The apparatus of claim 41, further comprising:

means for instantiating a timer after the step of sending each information request and before the step of forming the personalized web page; and means for, if no response is received from one of the component servers prior to a timeout period of the timer, performing the steps of immediately establishing the response from that component server as a null value, and carrying out the steps of forming the personalized network page and transmitting the personalized network page to the client without waiting for that response.

43. The apparatus of claim 42, wherein the information requests are transmitted according to a standard network protocol.

44. The apparatus of claim 43, wherein the standard network protocol is selected from the group consisting of HTTP, HTTPS, WAP, and FTP.

45. The apparatus of claim 41, wherein the component servers generate the responses in different data formats, wherein the apparatus further comprises:
means for converting the responses to a common data format.

46. The apparatus of claim 45, wherein the common data format is based on a markup language.

47. The apparatus of claim 45, wherein the means for converting is part of the respective component servers.

48. The apparatus of claim 45, wherein the means for converting is part of a main server, the main server also receiving the single request from the user and transmitting the personalized network page to the client.

49. The apparatus of claim 48, wherein the main server is a corporate portal server.

50. The apparatus of claim 48, wherein the main server is an Internet portal server.

51. The apparatus of claim 48, wherein each of the main server and the component servers are physically separate, and wherein the information requests and responses are transmitted according to a standard network protocol.

52. The apparatus of claim 51, wherein the standard network protocol is selected from the group consisting of HTTP, HTTPS, WAP, and FTP.

53. The apparatus of claim 52, wherein the component servers comprise an email server, an enterprise resource planning server, or a customer relationship management server, or combinations thereof.

54. The apparatus of claim 41, further comprising:
means for generating a state machine to represent the progress of each information request; and
means for recursively processing the state machines to advance the progress of each information request.

55. The apparatus of claim 41, the method further comprising uniquely identifying the user who wishes to view the personalized network page regardless of which access terminal is being used.

56. The apparatus of claim 41, the method further comprising caching one or more of the content components for retrieval without contacting the component server in a future request.

57. The apparatus of claim 56, wherein the caching comprises indexing at least one of the content components according to one or more user preferences.

58. The apparatus of claim 41, the method further comprising retrieving one or more previously cached content components for including in the personalized network page without contacting the corresponding component server.

59. The apparatus of claim 58, wherein at least one of the cached content components was indexed according to one or more user preferences, and wherein the retrieving comprises calling the at least one cached content component according to the indexing.

60. The apparatus of claim 41, the method further comprising providing a form allowing a user to select the components from a library of components.

61. An apparatus for satisfying a single request from a client for a plurality of content components derived from content hosted by a plurality of distinct, separately accessible component servers for forming a personalized network page, the apparatus comprising a processor configured to perform a method comprising:
receiving a single request specifying multiple content components derived from content hosted by the plurality of distinct, separately accessible component servers for forming the personalized network page;
after receiving the single request, generating a plurality of information requests for the content as parallel worker threads spawned from a main execution thread;
sending the plurality of requests as parallel or rapid sequential worker threads so that each information request is sent to the component server hosting the content corresponding to the information request before receiving a response to any of the information requests, thereby permitting concurrent generation of the content components at the component servers;
forming the content components from the responses to the information requests including assembling the personalized network page; and
transmitting the personalized network page including the multiple content components to the client and
wherein the single request comprises a request for a personalized Web page; and
wherein the forming comprises assembling the personalized Web page from the content components; and
wherein the transmitting comprises sending the personalized Web page to the client.

62. The apparatus of claim 61, wherein the method further comprises:
instantiating a timer after the step of sending each information request and before the step of forming the personalized web page; and
if no response is received from one of the component servers prior to a timeout period of the timer, performing the steps of
immediately establishing the response from that component server as a null value, and
carrying out the forming of the personalized network page and transmitting the personalized network page to the client without waiting for that response.

63. The apparatus of claim 62, wherein the information requests are transmitted according to a standard network protocol.

64. The apparatus of claim 63, wherein the standard network protocol is selected from the group consisting of HTTP, HTTPS, WAP, and FTP.

65. The apparatus of claim 61, wherein the component servers generate the responses in different data formats, wherein the method further comprises:
converting the responses to a common data format.

66. The apparatus of claim 65, wherein the common data format is based on a markup language.

67. The apparatus of claim 65, wherein the converting is performed at the respective component servers.

68. The apparatus of claim 65, wherein the converting is performed at a main server, the main server also receiving the single request from the user and transmitting the personalized network page to the client.

69. The apparatus of claim 68, wherein the main server is a corporate portal server.

70. The apparatus of claim 68, wherein the main server is an Internet portal server.

71. The apparatus of claim 68, wherein each of the main server and the component servers are physically separate, and wherein the information requests and responses are transmitted according to a standard network protocol.

72. The apparatus of claim 71, wherein the standard network protocol is selected from the group consisting of HTTP, HTTPS, WAP, and FTP.

73. The apparatus of claim 72, wherein the component servers comprise an email server, an enterprise resource planning server, or a customer relationship management server, or combinations thereof.

74. The apparatus of claim 61, wherein the method further comprises:
   generating a state machine to represent the progress of each information request; and
   recursively processing the state machines to advance the progress of each information request.

75. The apparatus of claim 61, the method further comprising uniquely identifying the user who wishes to view the personalized network page regardless of which access terminal is being used.

76. The apparatus of claim 61, the method further comprising caching one or more of the content components for retrieval without contacting the component server in a future request.

77. The apparatus of claim 76, wherein the caching comprises indexing at least one of the content components according to one or more user preferences.

78. The apparatus of claim 61, the method further comprising retrieving one or more previously cached content components for including in the personalized network page without contacting the corresponding component server.

79. The apparatus of claim 78, wherein at least one of the cached content components was indexed according to one or more user preferences, and wherein the retrieving comprises calling the at least one cached content component according to the indexing.

80. The apparatus of claim 61, the method further comprising providing a form allowing a user to select the components from a library of components.

* * * * *

UNITED STATES PATENT AND TRADEMARK OFFICE
CERTIFICATE OF CORRECTION

| | | |
|---|---|---|
| PATENT NO. | : 7,861,174 B2 | Page 1 of 1 |
| APPLICATION NO. | : 10/077423 | |
| DATED | : December 28, 2010 | |
| INVENTOR(S) | : Boris Andreyevich Krasnoiarov et al. | |

It is certified that error appears in the above-identified patent and that said Letters Patent is hereby corrected as shown below:

In column 5, line 52, after "method" insert -- . --.

In column 6, line 4, delete "FIG. 16." and insert -- FIG. 16 --, therefor.

In column 9, line 36, delete "A" and insert -- a --, therefor.

In column 11, line 11, delete "UIRL" and insert -- URL --, therefor.

In column 21, line 67, in claim 33, after "thereof" insert -- . --.

In column 22, line 46, in claim 41, after "content" insert -- corresponding to the information request before receiving a response to any of the information requests, thereby permitting concurrent generation of the content components at the component servers; --.

Signed and Sealed this
Twentieth Day of September, 2011

David J. Kappos
*Director of the United States Patent and Trademark Office*